(12) United States Patent
Balk et al.

(10) Patent No.: US 10,597,477 B2
(45) Date of Patent: Mar. 24, 2020

(54) FINELY DIVIDED AQUEOUS EMULSION POLYMERS AND USE THEREOF FOR HYDROPHOBIC COATINGS

(71) Applicant: BASF SE, Ludwigshafen (DE)

(72) Inventors: Roelof Balk, Boehl-Iggelheim (DE); Bastiaan Lohmeijer, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/512,303

(22) PCT Filed: Sep. 18, 2015

(86) PCT No.: PCT/EP2015/071400
§ 371 (c)(1),
(2) Date: Mar. 17, 2017

(87) PCT Pub. No.: WO2016/042116
PCT Pub. Date: Mar. 24, 2016

(65) Prior Publication Data
US 2017/0275407 A1 Sep. 28, 2017

(30) Foreign Application Priority Data
Sep. 19, 2014 (EP) .................................. 14185506

(51) Int. Cl.
*C08F 2/26* (2006.01)
*C08F 265/06* (2006.01)
*C09D 151/00* (2006.01)
*C09D 5/00* (2006.01)

(52) U.S. Cl.
CPC .............. *C08F 265/06* (2013.01); *C08F 2/26* (2013.01); *C09D 5/00* (2013.01); *C09D 151/003* (2013.01)

(58) Field of Classification Search
CPC ........ C08F 265/06; C08F 2/26; C08F 212/08; C08F 212/14; C08F 2220/1825; C09D 5/00; C09D 151/003; C08L 79/02
USPC ......................................................... 524/533
See application file for complete search history.

(56) References Cited

U.S. PATENT DOCUMENTS

| | | | |
|---|---|---|---|
| 4,269,749 A | 5/1981 | Marriott et al. | |
| 4,526,945 A | 7/1985 | Carlson et al. | |
| 4,680,354 A | 7/1987 | Lin et al. | |
| 5,023,294 A * | 6/1991 | Cozzi | C08F 20/36 524/547 |
| 8,519,043 B2 * | 8/2013 | Hartig | C09J 133/06 427/385.5 |
| 2002/0013405 A1 | 1/2002 | Sakaguchi et al. | |
| 2005/0107527 A1 | 5/2005 | Holub et al. | |
| 2012/0252972 A1 * | 10/2012 | Balk | C08F 2/22 524/809 |

FOREIGN PATENT DOCUMENTS

| | | |
|---|---|---|
| CN | 103517928 A | 1/2014 |
| DE | 40 03 422 A1 | 8/1991 |
| EP | 0 196 783 A1 | 10/1986 |
| EP | 0 199 436 A1 | 10/1986 |
| EP | 0 338 486 A2 | 10/1989 |
| EP | 0 710 680 A2 | 5/1996 |
| EP | 0 789 724 | 8/1997 |
| EP | 1 167 477 A1 | 1/2002 |
| EP | 2 371 870 A1 | 10/2011 |
| JP | 2005-272726 A | 10/2005 |
| JP | 2009-191228 A | 8/2009 |
| JP | 2010-138256 A | 6/2010 |
| RU | 2 184 125 C1 | 6/2002 |
| WO | 87/03605 A1 | 6/1987 |
| WO | 94/14355 A1 | 7/1994 |
| WO | 95/29944 A1 | 11/1995 |
| WO | 95/29963 A1 | 11/1995 |
| WO | 2008/152017 A1 | 12/2008 |
| WO | 2012/084973 A1 | 6/2012 |
| WO | 2012/084974 A1 | 6/2012 |
| WO | 2012/130712 A1 | 10/2012 |
| WO | 2012/140042 A1 | 10/2012 |

OTHER PUBLICATIONS

International Search Report dated Apr. 20, 2016 in PCT/EP2015/071400 filed Sep. 18, 2015.
International Preliminary Report on Patentability dated Mar. 23, 2017 in PCT/EP2015/071400 (with English language translation).
Chinese Office Action dated Nov. 5, 2018 in Chinese Patent Application No. 201580062442.1 (with partial English translation), 3 pages.
Xiao, Jinxin. et al., "Reactive Surfactant and Polymerizable Surfactant", Application Principles for Surfactants, IV., Chemical Industry Press. May 31, 2003, pp. 359-365 with cover pages.

* cited by examiner

*Primary Examiner* — Hannah J Pak
(74) *Attorney, Agent, or Firm* — Oblon, McClelland, Maier & Neustadt, L.L.P.

(57) ABSTRACT

The present invention relates to a polymer dispersion obtainable by at least one two-stage emulsion polymerization, by 1) preparing a polymer A by a radical polymerization from a 1st composition comprising A) at least one monomer, B) at least one anionic copolymerizable emulsifier, 2) admixing the polymer A prepared at 1) with a base, 3) in the presence of the polymer A treated at 2), preparing a polymer B by radical polymerization from a 2nd composition comprising A) at least one monomer, B) at least one anionic copolymerizable emulsifier. The present invention also relates to a process for preparing the polymer dispersion of the invention, to coating materials in the form of an aqueous composition comprising the polymer dispersion of the invention, and to the use of the polymer dispersion of the invention for coating compositions or paints and varnishes.

16 Claims, 1 Drawing Sheet

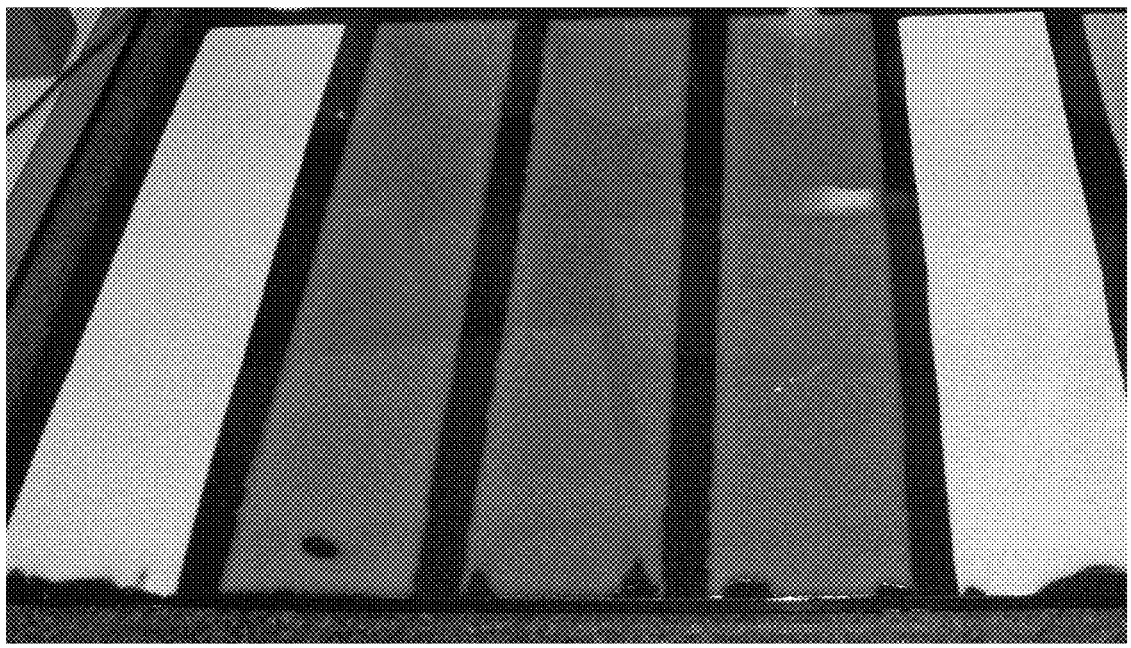

FINELY DIVIDED AQUEOUS EMULSION POLYMERS AND USE THEREOF FOR HYDROPHOBIC COATINGS

This application is a National Stage of PCT/EP2015/071400, which was filed on Sep. 18, 2015. This application is based upon and claims the benefit of priority to European Application No. 14185506.4, which was filed on Sep. 19, 2014.

The present invention relates to a polymer dispersion obtainable by at least one two-stage emulsion polymerization, by 1) preparing a polymer A by a radical polymerization from a 1st composition comprising A) at least one monomer, B) at least one anionic copolymerizable emulsifier, 2) admixing the polymer A prepared at 1) with a base, 3) in the presence of the polymer A treated at 2), preparing a polymer B by radical polymerization from a 2nd composition comprising A) at least one monomer, B) at least one anionic copolymerizable emulsifier. The present invention also relates to a process for preparing the polymer dispersion of the invention, to coating materials in the form of an aqueous composition comprising the polymer dispersion of the invention, and to the use of the polymer dispersion of the invention for coating compositions or paints and varnishes.

Polymer dispersions are common knowledge. They constitute fluid systems which comprise, in disperse distribution, polymer knots which consist of a plurality of interentangled polymer chains, these knots being present as a disperse phase in an aqueous dispersing medium, and being referred to as the polymer matrix or polymer particles. The average diameter of the polymer particles is frequently in the range from 10 to 1000 nm, more particularly in the range from 30 to 300 nm. Aqueous polymer dispersions are used as binders across a host of industrial applications.

Where they are used as binders for coatings on substrates, one of the important requirements for such coatings is that they possess great hardness and hence exhibit good scratch resistance and blocking resistance. On environmental grounds, filming of the binder in the range from <0 to 40° C. is desirable, so that little or no film-forming assistant is required. Another requirement is for a state of very fine division. This allows transparent aqueous stains to be produced, and allows the stain to penetrate the substrate effectively, particularly if the substrate to be coated is wood.

EP-B 0 710 680 discloses the possibility of using multi-stage emulsion polymerization to prepare polymer dispersions which exhibit a low minimum film-forming temperature (MFFT) and form films with high blocking resistance. Such polymer dispersions have an average polymer particle diameter of <100 nm. In the majority of cases, however, the state of fine division is not sufficient in order to formulate transparent stains for wood coatings that are desired in the wet state. In the dry state, wood stains form transparent or semitransparent coatings on wood. They comprise transparent pigments (e.g., transparent, ultrafine iron oxide) in an amount so small that the structure of the wood can still be perceived.

WO 2008/152017 describes a process for preparing an aqueous polymer dispersion by radically initiated aqueous emulsion polymerization of ethylenically unsaturated monomers in the presence of at least one dispersant and of at least one radical initiator. The dispersants used are employed therein at high levels.

WO 2012/130712 A1 describes multistage aqueous polymer dispersions which are film-forming at low temperatures, exhibit good blocking resistance in a formulation, even at elevated temperatures, exhibit a low foam propensity, and possess good wet adhesion and storage stability. Likewise described are processes for preparing them and their use as binders for the coating of substrates. The preparation takes place in the presence of emulsifiers.

WO 95/29963 A1 describes a process for preparing an aqueous, crosslinkable polymer composition which is free from organic solvents. The composition comprises an acid-functional polymer having a Tg of 10 to 125° C., crosslinkable functional groups, and a polymer B having a Tg of at least 25° C. below that of the polymer A.

WO 95/29944 A1 describes a process for preparing an organic solvent-free aqueous crosslinkable polymer composition, the process being free from organic solvent. The document does not describe any anionic copolymerizable emulsifiers.

WO 2012/084973 describes an aqueous polymer coating composition comprising at least one vinyl polymer A having a mass-average molar mass Mw in the range from 1000 to 150 000 g/mol and an acid number >5 mg KOH/g, and a vinyl polymer B having a mass-average molar mass Mw of at least 80 000 g/mol and an acid number <35 mg KOH/g. The document does not describe any anionic copolymerizable emulsifiers.

WO 2012/084974 A1 describes an aqueous polymer dispersion comprising a vinyl polymer having at least two phases, comprising: A) 40 to 90 wt % of a vinyl polymer A having a glass transition temperature in the range from −50 to 30° C., and B) 10 to 60 wt % of a vinyl polymer B having a glass transition temperature in the range from 50 to 130° C., the vinyl polymer A comprising 0.1 to 10 wt % of at least one acid-functional, olefinically unsaturated monomer, with at least 20 wt % of the vinyl polymer being used to form a vinyl polymer, and the vinyl polymer B being derived from at least one biologically derived, regenerative, olefinically unsaturated monomer.

EP 0 338 486 A2 describes a process for preparing stabilized latex, characterized by the steps of: a) mixing latex-forming monomers under emulsion polymerization conditions, in order in a first stage to form a hydrophilic, low molecular mass polymer reaction mixture, which can become water-soluble by virtue of a pH adjustment; b) contacting the reaction mixture comprising the polymer of the first stage with latex-forming monomers under emulsion polymerization conditions, in order in a second stage to form a hydrophobic polymer which forms an inverse coreshell emulsion with the polymer from the first stage, and c) adjusting the pH of the emulsion, in order to dissolve the polymer of the first stage and also the latex prepared.

WO 2012/2140042 describes a process for preparing aqueous vinyl polymer dispersions which exhibit good film-forming properties, good stability, and clarity, and also polymer dispersions obtainable by the process, and coating compositions produced from the polymer dispersions. At no point in the document is there any description of a two-stage emulsion polymerization in which in each case a copolymerizable emulsifier is used.

EP 2 371 870 A1 describes a multistage emulsion polymer comprising 10 to 30 wt %, based on the weight of the multistage emulsion polymer, of a shell, of a first polymer having an acid number of 5 to 100, the first polymer having a calculated Mn of 1000 to 4500 and a calculated Tg of less than 100° C., and from 70 to 90 wt %, based on the weight of the multistage emulsion polymer, of a core of a second polymer having an acid number from 0 up to half the acid number of the first polymer, the second polymer having a calculated Mn of greater than 20 000.

The object of the present invention was to prepare finely divided emulsion polymers which allow the formulation of transparent stains using polymeric thickeners and which nevertheless exhibit outstanding water resistance. The object, moreover, was to provide emulsion polymers which permit film formation at low temperature, more particularly below 5° C. and without use of film-forming assistants. The coatings, furthermore, ought to exhibit high hardness and blocking resistance.

The object is achieved by means of a polymer dispersion obtainable by at least one two-stage emulsion polymerization, by
1) preparing a polymer A by a radical polymerization from a 1st composition comprising
   A) at least one monomer,
   B) at least one anionic copolymerizable emulsifier,
2) admixing the polymer A prepared at 1) with a base,
3) in the presence of the polymer A treated at 2), preparing a polymer B by radical polymerization from a 2nd composition comprising
   A) at least one monomer,
   B) at least one anionic copolymerizable emulsifier.

The object is likewise achieved by a process for preparing the polymer dispersion of the invention, by
carrying out at least one two-stage emulsion polymerization comprising the steps of:
1) preparing a polymer A by a radical polymerization from a 1st composition comprising
   A) at least one monomer,
   B) at least one anionic copolymerizable emulsifier,
2) admixing the polymer A prepared at 1) with a base,
3) in the presence of the polymer A treated at 2), preparing a polymer B by radical polymerization from a 2nd composition comprising
   A) at least one monomer,
   B) at least one anionic copolymerizable emulsifier.

The emulsion polymerization of the first and second stages here may be started with water-soluble initiators.

The object is achieved, moreover, by a coating material in the form of an aqueous composition comprising
   i) at least one polymer dispersion of the invention,
   ii) optionally at least one (in)organic filler and/or (in)organic pigment,
   iii) optionally an additive,
   iv) water.

The object is likewise achieved by the use of the polymer dispersion of the invention for coating compositions or paints.

Implementing radically initiated emulsion polymerizations of monomers, especially unsaturated monomers, in an aqueous medium has been a topic of prior description on many occasions and is therefore adequately known to the skilled person [in this regard, see Emulsion polymerization in Encyclopedia of Polymer Science and Engineering, vol. 8, pages 659 ff. (1987); D. C. Blackley, in High Polymer Latices, vol. 1, pages 35 ff. (1966); H. Warson, The Applications of Synthetic Resin Emulsions, chapter 5, pages 246 ff. (1972); D. Diederich, Chemie in unserer Zeit 24, pages 135 to 142 (1990); Emulsion Polymerisation, Interscience Publishers, New York (1965); DE-A 40 03 422; and Dispersionen synthetischer Hochpolymerer, F. Hölscher, Springer-Verlag, Berlin (1969)]. The normal procedure for the radically initiated aqueous emulsion polymerization reactions is that the (ethylenically unsaturated) monomers are dispersed in the form of monomer droplets in the aqueous medium, with accompanying use of dispersants, and are polymerized by means of a radical polymerization initiator.

"Two-stage" emulsion polymerization in the sense of the present invention may be understood as an emulsion polymerization in which a radical emulsion polymerization takes place in a first stage, and the monomers present in the $1^{st}$ composition undergo complete polymerization to form a polymer. This is followed optionally by neutralization with a base. After that there is a second stage, in which new monomers are polymerized by means of a radical emulsion polymerization, in the presence of the polymer from the first stage, to form a polymer. In the sense of the present invention, "1)" corresponds to the first stage and "3)" to the second stage in the emulsion polymerization.

The term "copolymerizable emulsifier" encompasses monomers which as well as radically polymerizable groups have a lipophilic radical and a hydrophilic radical. As a result it is possible to mix two immiscible substances with one another, forming a dispersion, more particularly an emulsion.

A "polymer" in the sense of the present invention may refer to a mixture of polymers which comes about in a formation reaction from monomers to give macromolecules.

The term (in)organic encompasses inorganic and/or organic.

The polymer dispersion of the invention is prepared by emulsion polymerization. In the emulsion polymerization, unsaturated compounds (monomers), especially ethylenically unsaturated compounds, are polymerized in water.

In this polymerization, the anionic copolymerizable emulsifiers (also called protective colloids or stabilizers) are used as surface-active compounds to stabilize the monomer droplets and the polymer particles formed later from the monomers. In accordance with the invention, however, both the polymerization of the first stage and the polymerization of the second stage take place in the presence of the anionic copolymerizable emulsifiers.

With preference a total of less than 2.5 or less than 2.0 wt % of anionic copolymerizable emulsifier is used, more particularly less than 1.5 wt %, based on the solids content of the completed polymer dispersion.

The solids content of the dispersion is preferably 25-55 wt %, based on the total amount of the liquid components of the dispersion. The solids content is more preferably 30-50 wt %.

Furthermore, customary auxiliaries and adjuvants may be added to the polymer dispersions. They include, for example, pH modifiers, reducing agents, and bleaches, such as the alkali metal salts of hydroxymethanesulfinic acid (e.g., Rongalit® C from BASF Aktiengesellschaft), complexing agents, deodorants, odorants, and viscosity modifiers, such as alcohols, examples being glycerol, methanol, ethanol, tert-butanol, glycol, etc. These auxiliaries and adjuvants may be added to the polymer dispersions in the initial charge, to one of the feeds, or after the end of the polymerization.

The polymer A is preferably admixed with a base. In this case, for example, acid groups of the polymer A can be neutralized, more particularly by at least partial feeding of a base before and/or during the polymerization of the second stage. This base may be added in a joint feed with the monomers to be polymerized, or in a separate feed, in particular after the first stage. After all of the monomers of the $2^{nd}$ stage have been fed, the polymerization vessel preferably comprises the amount of base required to neutralize at least 70%, more preferably 70% to 100% or 70% to 95%, of acid equivalents.

The neutralization implemented following the first stage takes place with a base. The base results in partial or complete neutralization of the ionic or latent ionic groups of the polymer of the first stage; it may lead to swelling of the polymer particles, or else carry them completely into solution. Preferably only a partial neutralization is performed—for example, at least 70% of the ionic or latent ionic groups present. Bases used may be, for example, alkali metal or alkaline earth metal compounds such as sodium hydroxide, potassium hydroxide, calcium hydroxide, magnesium oxide, sodium carbonate; ammonia; primary, secondary, and tertiary amines, such as ethylamine, propylamine, monoisopropylamine, monobutylamine, hexylamine, ethanolamine, dimethylamine, diethylamine, di-n-propylamine, tributylamine, triethanolamine, dimethoxyethyl-amine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, dimethylaminopropylamine, neopentanediamine, hexamethylenediamine, 4,9-dioxadodecane-1,12-diamine, polyethylenimine or polyvinylamine.

Ammonia is used preferably as base.

The polymerization can be carried out in the first stage by means of the method of the in situ seed regime. For this, a portion of a monomer or of the monomer mixture of the first stage, as for example <35 wt %, preferably <20 wt %, based on the total weight of the monomers of the first stage, is included in the initial charge together with the anionic copolymerizable emulsifier, as for example <10 wt %, preferably <3 wt %, based on the total weight of the monomers of the first stage, and polymerization is commenced by means of an initiator, after which, subsequently, the remainder of the first stage is metered in.

The monomers of the second stage may be added in the manner of a gradient regime. The gradient regime in the sense of the present invention refers to an emulsion polymerization in which one or more monomers are metered in at nonconstant rate. For reasons of ease of apparatus operability, in the experiments described here, the rates were varied not continuously (="true gradient") but instead stepwise (=interpolated gradient) (in the mathematical sense, accordingly, the plot of the metering rate against time represents a nonconstant function). In principle, however, continuous rate changes can be implemented even without great extra cost and complexity.

The weight-average molecular weight of the monomers of the polymerization of the first stage is between 2 and 35 kDa, preferably between 5 and 25 kDa. The monomers of the polymerization of the first stage are selected such that the glass transition temperature calculated for a polymer prepared from the monomers of the first stage is greater than 50° C., being situated more particularly in the range from 50° C. to 150° C. or in the range from 70° C. to 125° C.

Through targeted variation in nature and amount of the monomers it is possible in accordance with the invention for the skilled person to prepare polymer compositions, especially aqueous polymer compositions, whose polymers have a glass transition temperature within the desired range. Orientation is possible by means of the Fox equation. According to Fox (T. G. Fox, Bull. Am. Phys. Soc. 1956 [Ser. II] 1, page 123 and in accordance with Ullmann's Encyclopädie der technischen Chemie, vol. 19, page 18, 4th edition, Verlag Chemie, Weinheim, 1980), the calculation of the glass transition temperature of copolymers is governed in good approximation by:

$$1/Tg = X^1Tg^1 + X^2/Tg^2 + \ldots X^n/Tg^n,$$

where $x^1, x^2, \ldots x^n$ are the mass fractions of the monomers 1, 2 . . . n and $Tg^1, Tg^2 \ldots Tg^n$ are the glass transition temperatures, in degrees Kelvin, of the polymers synthesized in each case only from one of the monomers 1, 2 . . . n. The Tg values for the homopolymers of the majority of monomers are known and are listed in, for example, Ullmann's Encyclopedia of Industrial Chemistry, vol. 5, vol. A21, page 169, VCH Weinheim, 1992; other sources of glass transition temperatures of homopolymers include, for example, J. Brandrup, E. H. Immergut, Polymer Handbook, $1^{st}$ Ed., J. Wiley, New York 1966, $2^{nd}$ Ed. J. Wiley, New York 1975, and $3^{rd}$ Ed. J. Wiley, New York 1989. For ethyl acrylate a figure of −13° C. is used.

The monomers of the polymerization of the second stage are selected such that the glass transition temperature calculated for a polymer prepared from the monomers of the second stage is at least 50° C. lower than that of the first stage, being situated preferably in the range less than 10° C., more particularly in the range from 0° C. to −80° C.

The emulsion polymerization of the first and second stages may be initiated using water-soluble initiators. Water-soluble initiators are, for example, ammonium and alkali metal salts of peroxodisulfuric acid, e.g., sodium peroxodisulfate, hydrogen peroxide, or organic peroxides, e.g. tert-butyl hydroperoxide. Also suitable as initiator are what are called reduction/oxidation (redox) initiator systems. The redox initiator systems consist of at least one, usually inorganic, reducing agent and one inorganic or organic oxidizing agent. The oxidizing component comprises, for example, the emulsion polymerization initiators already stated above. The reducing component comprises, for example, alkali metal salts of sulfurous acid, such as sodium sulfite, sodium hydrogensulfite, alkali metal salts of disulfurous acid such as sodium disulfite, bisulfite addition compounds with aliphatic aldehydes and ketones, such as acetone bisulfite, or reducing agents such as hydroxymethanesulfinic acid and its salts, or ascorbic acid, for example. The redox initiator systems may be used together with soluble metal compounds whose metallic component is able to occur in a plurality of valence states. Typical redox initiator systems are, for example, ascorbic acid/iron(II) sulfate/sodium peroxydisulfate, tert-butyl hydroperoxide/sodium disulfite, tert-butyl hydroperoxide/Na-hydroxymethanesulfinic acid. The individual components, the reducing component for example, may also be mixtures—for example, a mixture of the sodium salt of hydroxymethanesulfinic acid and sodium disulfite.

The stated initiators may be used in the form of aqueous solutions, in which case the lower concentration is determined by the amount of water that is acceptable in the dispersion, and the upper concentration by the solubility of the respective compound in water. Generally speaking, the concentration of the initiators is 0.1 to 30 wt %, preferably 0.2 to 20 wt %, more preferably 0.3 to 10 wt %, based on the monomers to be polymerized in the respective stage. It is also possible for two or more different initiators to be used in the emulsion polymerization.

In the polymerization, particularly in the $1^{st}$ composition, at least one of the following monomers A1), A2) and/or A3) may be used as A):

A1) (cyclo)alkyl (meth)acrylates, vinylaromatic, radically polymerizable compounds, crosslinkers and/or α,β-ethylenically unsaturated carboxamide.

This includes preferably those (cyclo)alkyl (meth)acrylates whose linear, cyclic and/or branched alkyl radical has 1 to 20 carbon atoms, more preferably 1 to 10, very preferably 1 to 8, and more particularly 1 to 4 carbon atoms. In the case of cyclic compounds, the alkyl radical has at least 3 carbon atoms.

Examples of (cyclo)alkyl (meth)acrylates are methyl (meth)acrylate, allyl (meth)acrylate, ethyl (meth)acrylate, n-propyl (meth)acrylate, n-butyl (meth)acrylate, isobutyl (meth)acrylate, sec-butyl (meth)acrylate, tert-butyl (meth) acrylate, n-pentyl (meth)acrylate, isopentyl (meth)acrylate, 2-methylbutyl (meth)acrylate, amyl (meth)acrylate, 2,3-epoxypropyl methacrylate, n-hexyl (meth)acrylate, 2-ethylbutyl (meth)acrylate, pentyl (meth)acrylate, n-heptyl (meth) acrylate, n-octyl (meth)acrylate, 2-ethylhexyl (meth) acrylate (2-ethylhexyl acrylate), 2-propylheptyl (meth) acrylate, n-decyl (meth)acrylate, undecyl (meth)acrylate, and n-dodecyl (meth)acrylate and cyclohexyl (meth)acrylate.

Preference is given to methyl methacrylate, methyl acrylate, ethyl acrylate, n-butyl acrylate, n-butyl methacrylate, n-hexyl acrylate, n-octyl acrylate, 2-ethylhexyl acrylate, allyl methacrylate, allyl acrylate, 2,3-epoxypropyl (meth) acrylate, and 3-propylheptyl acrylate, or mixtures thereof.

Preferably included are vinylaromatics having up to 20 C atoms.

Vinylaromatic compounds contemplated include vinyltoluene, vinylnapthalene, α- and p-methylstyrene, α-butylstyrene, 4-n-butylstyrene, 4-n-decylstyrene, and preferably styrene and α-methylstyrene.

The at least one radically polymerizable compound is selected from the group consisting of ethylenically unsaturated nitriles having up to 20 C atoms, vinyl esters of carboxylic acids comprising up to 20 C atoms, vinyl halides having up to 10 C atoms, and vinyl ethers of alcohols comprising from 1 to 10 C atoms, or mixtures thereof.

Examples of ethylenically unsaturated nitriles are fumaronitrile, acrylonitrile, and methacrylonitrile, preferably acrylonitrile and methacrylonitrile, and more preferably acrylonitrile. Vinyl esters of carboxylic acids having 1 to 20 C atoms are, for example, vinyl laurate, vinyl stearate, vinyl propionate, vinyl esters of Versatic acid, vinyl butyrate, and vinyl acetate, preferably vinyl acetate. The vinyl halides are chloro-, fluoro-, or bromo-substituted ethylenically unsaturated compounds, preferably vinyl chloride and vinylidene chloride.

Crosslinkers are compounds which have at least two radically polymerizable double bonds, preferably 2 to 6, more preferably 2 to 4, very preferably 2 to 3, and more particularly precisely 2.

Examples that may be given of di- and poly(meth)acrylates are 1,2-, 1,3-, and 1,4-butanediol diacrylate, 1,2- and 1,3-propylene glycol (meth)acrylate, 1,6-hexanediol di(meth)acrylate, 1,2-ethylene glycol di(meth)acrylate, neopentyl glycol di(meth)acrylate, diethylene glycol di(meth)acrylate, triethylene glycol di(meth)acrylate, tetraethylene glycol di(meth)acrylate, trimethylolpropane tri(meth)acrylate, trimethylolethane tri(meth)acrylate, pentaerythritol tri- and tetra(meth)acrylate.

Mention may further be made of divinylbenzene and allyl (meth)acrylate.

The α,β-ethylenically unsaturated carboxamide is selected from the group consisting of (meth)acrylamide, crotonamide, amides of dicarboxylic acids, or mixtures thereof. Particular preference is given to itaconamide, maleimide, or fumaramide; especially preferred are methacrylamide and acrylamide.

Also suitable in particular are mixtures of the (cyclo)alkyl (meth)acrylates, vinylaromatics, radically polymerizable compounds, crosslinkers and/or α,β-ethylenically unsaturated carboxamides.

A2) at least one α,β-ethylenically unsaturated carboxylic acid

These are α,β-ethylenically unsaturated carboxylic acids having 3 to 10, preferably 3 to 6, more preferably 3 to 4 carbon atoms. The ionic groups may optionally also be present in latent form, as in maleic anhydride, for example, where the acid functionality is present in the form of an anhydride group.

Preferred are (meth)acrylic acid, crotonic acid, or dicarboxylic acids, e.g., itaconic acid, maleic acid, or fumaric acid, more preferably methacrylic acid and acrylic acid, or else mixtures thereof.

(Meth)acrylic (acid) in this description stands for methacrylic (acid) and acrylic (acid).

The compounds A3) are selected from the group consisting of 2-(2-oxoimidazolidin-1-yl)ethyl (meth)acrylate, 2-ureidoethyl (meth)acrylate (UMA), acetoacetoxyethyl acrylate, acetoacetoxypropyl methacrylate, acetoacetoxybutyl methacrylate, 2-(acetoacetoxy)ethyl methacrylate (AAEMA), diacetoneacrylamide (DAAM), diacetonemethacrylamide, or mixtures thereof.

The monomer A1) has preferably 40 to 94 wt %, more preferably 42 to 80 wt %, and very preferably 65 to 80 wt % in the $1^{st}$ composition, the quantity figures for A1) being based on in each case 100 wt % of the monomers to be polymerized in the $1^{st}$ composition.

The monomer A2) has preferably 1 to 15 wt %, more preferably 2 to 13 wt %, and very preferably 5 to 12 wt % in the $1^{st}$ composition, the quantity figures for A2) being based on in each case 100 wt % of the monomers to be polymerized in the $1^{st}$ composition.

The monomer A3) has preferably 5 to 45 wt %, more preferably 5 to 30 wt %, and very preferably 5 to 15 wt % in the $1^{st}$ composition, the quantity figures for A3) being based on in each case 100 wt % of the monomers to be polymerized in the $1^{st}$ composition.

In the polymer dispersion of the invention, a polymer A is preferably prepared in aqueous medium by a radical emulsion polymerization.

The polymer A in the polymer dispersion of the invention is preferably dispersed in water.

The vinyl monomers used, especially the monomers A3), may comprise monomers having functional groups such as crosslinking groups and hydrophilic, water-dispersible groups. Certain functional groups may have more than one function. (Meth)acrylic acid, for example, is utilized normally as a water-dispersible monomer, but here may also act as a crosslinking monomer, and may react, for example, with epoxide compounds or carbodiimides.

The functional groups of the monomers make a contribution to imparting the latent crosslinkability to the composition. The crosslinking here takes place either by reaction with one another or by addition of a crosslinking additive. Crosslinking takes place preferably not until after the actual film-forming.

It is important here not to use too much crosslinking additive, since this can lead to residues of remaining crosslinking agent. Too little crosslinking additive, on the other hand, may lead to a soluble coating.

The polymer dispersion of the invention preferably further comprises a crosslinking additive.

This crosslinking additive may be a polyhydrazide, a polyamine, or a mixture thereof. Functional crosslinker groups are, for example, keto, aldehyde and/or acetoacetoxy carbonyl groups, and the subsequently added, formulated, crosslinking additives (crosslinking agents) may comprise a polyamine such as ethylenediamine, propylenediamine, butylenediamine, 1,6-hexamethylenediamine (NMDA), octamethylenediamine, an ethoxy/propoxylated di- or polyamine, a di- or trifunctional Jeffamine, isophoronediamine, 4,7-dioxadecane-1,10-diamine, or polyhydrazide such as adipic dihydrazide (ADDH), oxalic dihydrazide, phthalic dihydrazide, or terephthalic dihydrazide, or a cross-linking additive which carries semicarbazide or hydrazine-functional groups. Alternatively the polymer could carry hydrazide-functional groups, and the subsequently formulated comprise crosslinking additive (crosslinking agent) could, keto-functional groups.

The functional groups may also be carboxyl functions, and the subsequently formulated cross-linking agent could comprise aziridine-, epoxide-, or carbodiimide-functional groups, or the functional groups may be silane-functional groups and the subsequently formulated, crosslinking additive (crosslinking agent) may likewise comprise silane-functional groups.

The functional groups may also be ureido groups, and the subsequently added crosslinking additive may be a polyaldehyde, as for example an α,ω-dialdehyde having 1 to 10 C atoms, such as glyoxal, glutaraldehyde or malonaldehyde, and/or acetals and hemiacetals thereof, as is described in EP 0789724, for example.

The polymer dispersion of the invention preferably comprises 2 to 15 wt %, based on the total amount of the monomers used in the $1^{st}$ composition, of a crosslinking additive.

The polymer dispersion of the invention more preferably comprises 20 to 500 wt % and very preferably 20 to 100 wt %, based on the total amount of the monomers A3) used in the $1^{st}$ composition, of a crosslinking additive.

In the polymer dispersion of the invention, the $1^{st}$ composition preferably comprises
  A1) at least one (cyclo)alkyl (meth)acrylate,
  A2) at least one α,β-ethylenically unsaturated carboxylic acid,
  A3) at least one compound selected from the group consisting of 2-(2-oxoimidazolidin-1-yl)ethyl (meth)acrylate, 2-ureidoethyl (meth)acrylate (UMA), acetoacetoxyethyl acrylate, acetoacetoxypropyl methacrylate, acetoacetoxybutyl methacrylate, 2-(acetoacetoxy)ethyl methacrylate, diacetoneacrylamide (DAAM), diacetonemethacrylamide, or mixtures thereof, and
  A4) at least one chain transfer agent, and
  B) at least one anionic copolymerizable emulsifier.

One preferred embodiment of the invention uses at least one chain transfer agent (CTA) in the polymerization of the first stage. By this means it is possible, through a chain termination reaction, to reduce the molar mass of the emulsion polymer. These CTAs are bonded onto the polymer, generally onto the chain end. The amount of the CTAs is in particular 0.05 to 5 parts by weight, more preferably 0.05 to 2 parts by weight, based on 100 parts by weight of the total monomers to be polymerized in the first and second stages. Examples of suitable CTAs are compounds having a thiol group such as tert-butyl mercaptan, alkyl thioglycolates, mercaptoethanol, mercaptopropionic acid, 2-ethylhexyl thioglycolate, mercaptopropyltrimethoxysilane, and n- or tert-dodecyl mercaptan. The CTAs are generally compounds of low molecular mass, having a molar weight of less than 2000, more particularly less than 1000 g/mol.

Particularly preferred is 2-ethylhexyl thioglycolate, alkyl thioglycolates, mercaptopropionic acid and/or isooctyl mercaptopropionate.

Likewise useful as CTA is a catalytic amount of a transition metal complex and, in particular, of a cobalt chelate complex; this technology is known in the field of art as catalytic chain transfer (CCT) polymerization.

A technology of this kind is described in the literature. Various references, as for example N. S. Enikolopyan et al., J. Polym. Sci., Polym. Chem. Ed., volume 19, 879 (1981), disclose, for example, the use of cobalt(II)-porphyrin complexes as chain transfer agents in radical polymerization, while U.S. Pat. No. 4,526,945 discloses for this purpose the use of dioxime complexes of cobalt(II). Various other publications, examples being U.S. Pat. No. 4,680,354, EP-A-0 196 783, and EP-A-0 199 436, describe the use of certain and other types of cobalt(II) chelates as chain transfer agents for the preparation of oligomers from olefinically unsaturated monomers by radical polymerization. WO-A-87/03605, on the other hand, claims the use of certain cobalt(II) chelate complexes for this purpose, and also the use of certain chelate complexes of other metals, such as iridium and rhenium, for example.

The metal chelate complexes which are disclosed in these references, and also the specific polymerization techniques disclosed therein for the implementation of the catalytic chain transfer polymerization, are incorporated here by this reference.

In the polymer dispersion of the invention, the $2^{nd}$ composition preferably comprises
  A1) at least one (cyclo)alkyl (meth)acrylate and/or a vinylaromatic, and
  B) at least one anionic copolymerizable emulsifier.

Particularly preferred as A1) in the $2^{nd}$ composition is 2-ethylhexyl acrylate, n-hexyl acrylate, n-octyl acrylate, 3-propylheptyl acrylate and/or styrene.

In the polymer dispersion of the invention, the at least one anionic copolymerizable emulsifier is preferably selected from the group consisting of
  (1) a compound of formula (I)

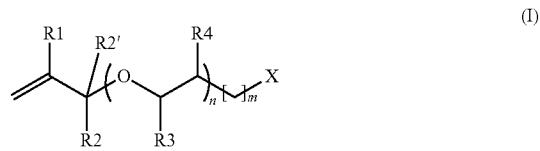

where
  R1 is H, alkyl, cycloalkyl, aralkyl, aryl, or alkoxyaryl,
  R2, R2' is H or R2 and R2' are O,
  R3 is H or alkyl,
  R4 is H or OH,
  X is $SO_3^-$, $HPO_4^-$, $PO_4^{2-}$, or $COO^-$,
  m is 0 or 1, and
  n is an integer between 0 and 1000, more particularly between 1 and 1000;

(2) a compound of formula (II)

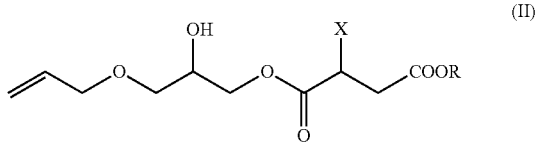

where
X is $SO_3^-$, $PO_4^{2-}$, or $SO_4^-$, and
R is H, alkyl, cycloalkyl, aralkyl, aryl or alkoxyaryl;
(3) a compound of formula (III)

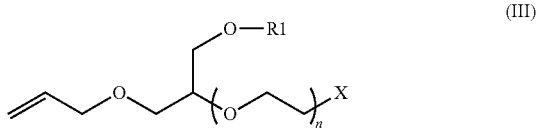

where
R1 is H, alkyl, cycloalkyl, aralkyl, aryl or alkoxyaryl,
X is $SO_4^-$, $SO_3^-$, $HPO_4^-$, $PO_4^{2-}$, or $COO^-$, and
n is an integer between 0 and 1000, more particularly between 1 and 1000;
(4) a compound of the formula (IV)

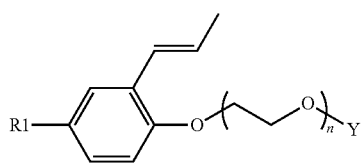

where
R1 is H, alkyl, cycloalkyl, aralkyl, aryl, or alkoxyaryl,
Y is $SO_3^-$, $PHO_3^-$, or $PO_3^{2-}$, and
n is an integer between 0 and 1000, more particularly between 1 and 1000;
or mixtures of the compounds of the formulae (I) to (IV).

The anionic copolymerizable emulsifiers may be present in neutralized form. Counterion present for the anionic groups X and/or Y is preferably a cation selected from the group of $H^+$, $Li^+$, $Na^+$, $K^+$, $Ca^{2+}$, $NH_4^+$, or mixtures thereof.
The cation is preferably $NH_4^+$ or $Na^+$.

"Alkyl" denotes a saturated aliphatic hydrocarbon group, which may be straight-chain or branched and may have from 1 to 20 carbon atoms in the chain. Preferred alkyl groups may be straight-chain or branched and have from 1 up to 10 carbon atoms in the chain. Branched means that a lower alkyl group, such as methyl, ethyl, or propyl, is attached to a linear alkyl chain. Alkyl is, for example, methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, 1-heptyl, 1-octyl, 1-nonyl, 1-decyl, 1-undecyl, 1-dodecyl, 1-tetradecyl, 1-hexadecyl, and 1-octadecyl.

"Cycloalkyl" denotes an aliphatic ring which has from 3 to 10 carbon atoms in the ring. Preferred cycloalkyl groups have from 4 to approximately 7 carbon atoms in the ring.

"Aryl" denotes phenyl or naphthyl. "Aralkyl" denotes an alkyl group substituted by an aryl radical. "Substituted aralkyl" and "substituted aryl" denote that the aryl group, or the aryl group of the aralkyl group, is substituted by one or more substituents selected from alkyl, alkoxy, nitro, carboalkoxy, cyano, halo, alkylmercaptyl, trihaloalkyl, or carboxyalkyl.

"Alkoxy" denotes an alkyl-O— group in which "alkyl" has the definition described above. Lower alkoxy groups are preferred. Exemplary groups include methoxy, ethoxy, n-propoxy, iso-propoxy, and n-butoxy.

"Lower alkyl" denotes an alkyl group having 1 to approximately 7 carbon atoms.

"Alkoxyaryl" denotes an aryl group as described above which is substituted by an alkoxy group as described above.

"Halogen" (or "halo") denotes chlorine (chloro), fluorine (fluoro), bromine (bromo), or iodine (iodo).

With particular preference the anionic copolymerizable emulsifier is selected from the group consisting of
(1) a compound of formula (I)

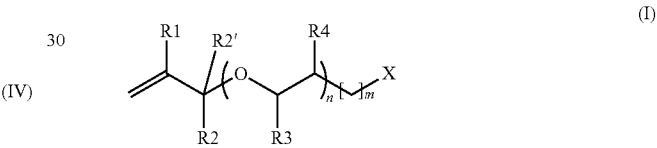

where
R1 is H or alkyl,
R2, R2' is H or R2 and R2' are O,
R3 is H,
R4 is H or OH,
X is $SO_3^-$, $HPO_4^-$, $PO_4^{2-}$,
m is 0 or 1, and
n is an integer between 1 and 1000, preferably 1 to 500, very preferably 4 to 50;
(2) a compound of formula (II)

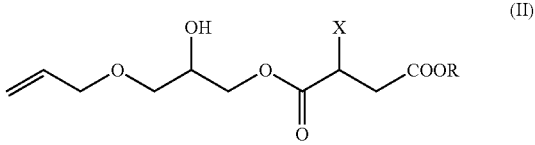

where
X is $SO_3^-$, $HPO_4^-$, $PO_4^{2-}$, and
R is H or alkyl;
(3) a compound of formula (III)

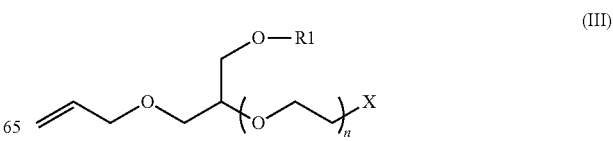

where
R1 is H,
X is SO$_4^-$, and
n is an integer between 1 and 1000, preferably 1 to 500, very preferably 4 to 50;
(4) a compound of the formula (IV)

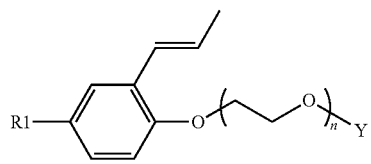

where
R1 is H or alkyl,
Y is SO$_3^-$, and
n is an integer between 1 and 1000, preferably 1 to 500, very preferably 4 to 50.

The anionic copolymerizable emulsifier may preferably be a compound of formula (III)

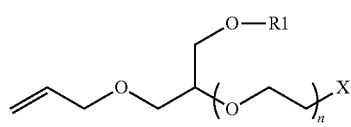

with the following definitions:
R1 is H,
X is SO$_4^-$,
n is an integer between 1 and 1000, preferably 1 to 250, very preferably 4 to 50.

The anionic copolymerizable emulsifier may preferably be a compound of formula (IV)

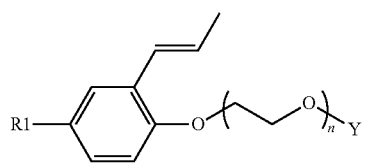

with the following definitions:
R1 is H or alkyl,
Y is SO$_3^-$,
n is an integer between 1 and 1000, preferably 1 to 500, very preferably 4 to 50.

The copolymerizable emulsifiers of the formula (I) that are used in the polymer dispersion of the invention are also referred to as phosphate esters of polyethylene glycol monoacrylates. The copolymerizable emulsifiers of the formula (I) may likewise also be referred to as phosphonate esters of polyethylene glycol monoacrylates, or allyl ether sulfates. Commercially available co-polymerizable emulsifiers of the formula (I) are Maxemul® or Sipomer® PAM emulsifiers.

The copolymerizable emulsifiers of the formula (II) that are used in the polymer dispersion of the invention are also referred to as polyoxyalkylenealkenyl ether sulfates. Commercially available copolymerizable emulsifiers of the formula (II) are Latemul® PD emulsifiers.

The copolymerizable emulsifiers of the formula (III) that are used in the polymer dispersion of the invention are also referred to as branched unsaturated alkyl alkoxysulfonates or alkyl alkoxysulfates. Commercially available copolymerizable emulsifiers of the formula (III) are Adeka® Reasoap emulsifiers.

The copolymerizable emulsifiers of the formula (IV) that are used in the polymer dispersion of the invention are also referred to as sodium or ammonium salts of polyoxyethylenealkyl phenyl ethers. Commercially available copolymerizable emulsifiers of the formula (IV) are Hitenol® BC emulsifiers.

The particle size of the polymer A and/or of the polymer B in the polymer dispersion of the invention is preferably in a range from 1 nm to 100 nm, more particularly in a range from 5 nm to 75 nm, and very preferably in a range from 35 to 50 nm. The particle size of the polymer of the invention was determined by means of hydrodynamic chromatography (HDC).

In the polymer dispersion of the invention, the 1$^{st}$ composition preferably comprises
A1) 40-94 wt % of at least one (cyclo)alkyl (meth) acrylate,
A2) 1-15 wt % of at least one α,β-ethylenically unsaturated carboxylic acid,
A3) 5-45 wt % of at least one compound selected from the group consisting of 2-(2-oxoimidazolidin-1-yl)ethyl (meth)acrylate, 2-ureidoethyl (meth)acrylate (UMA), acetoacetoxyethyl acrylate, acetoacetoxypropyl methacrylate, acetoacetoxybutyl methacrylate, 2-(acetoacetoxy)ethyl methacrylate, diacetoneacrylamide (DAAM), diacetonemethacrylamide, or mixtures thereof,
the quantity figures of A1) to A3) being based in each case on 100 wt % of the monomers to be polymerized in the 1$^{st}$ composition.

The expression "the quantity figure being based in each case on 100 wt % of the monomers to be polymerized in the 1$^{st}$ composition" can be equated with "the weight fractions adding up to 100 wt % in each case". In other words, this means that A1) to A3) add up in total to 100 wt %. Correspondingly, this also applies to A1) to B).

In the polymer dispersion of the invention, the 1$^{st}$ composition preferably comprises
A1) 40-93.9 wt % of at least one (cyclo)alkyl (meth) acrylate,
A2) 1-15 wt % of at least one α,β-ethylenically unsaturated carboxylic acid,
A3) 5-20 wt % of at least one compound selected from the group consisting of 2-(2-oxoimidazolidin-1-yl)ethyl (meth)acrylate, 2-ureidoethyl (meth)acrylate (UMA), acetoacetoxyethyl acrylate, acetoacetoxypropyl methacrylate, acetoacetoxybutyl methacrylate, 2-(acetoacetoxy)ethyl methacrylate, diacetoneacrylamide (DAAM), diacetonemethacrylamide, or mixtures thereof,
A4) 0-5 wt % of chain transfer agent(s), and
B) 0.05-5 wt % of at least one anionic copolymerizable emulsifier,
the quantity figures of A1) to B) being based in each case on 100 wt % of the monomers to be polymerized in the 1$^{st}$ composition.

In the polymer dispersion of the invention, the 2$^{nd}$ composition preferably comprises
A1) 85-99.9 wt % of at least one (cyclo)alkyl (meth) acrylate, and B) 0.05-5 wt % of at least one anionic copolymerizable emulsifier, the quantity figures of A1) to B) being based in each case on 100 wt % of the monomers to be polymerized in the $2^{nd}$ composition.

The polymer dispersion of the invention is preferably free from nonpolymerizable emulsifiers.

Araliphatic or aliphatic nonionic emulsifiers are for example ethoxylated mono-, di-, and tri-alkylphenols (EO degree: 3 to 50, alkyl radical: C4-C10), ethoxylates of long-chain alcohols (EO degree: 3 to 100, alkyl radical: C8-C36), and also polyethylene oxide/polypropylene oxide homopolymers and copolymers. These may comprise the alkylene oxide units in copolymerized form in statistical distribution or in the form of blocks, e.g., EO/PO block copolymers.

Anionic emulsifiers are, for example, alkali metal salts and ammonium salts of alkyl sulfates (alkyl radical: C8-C22), of sulfuric monoesters with ethoxylated alkanols (EO degree: 2 to 50, alkyl radical: C12-C18) and with ethoxylated alkylphenols (EO degree: 3 to 50, alkyl radical: C4-C9), of alkylsulfonic acids (alkyl radical: C12-C18) and of alkylarylsulfonic acids (alkyl radical: C9-C18). Further emulsifiers are found in Houben-Weyl, Methoden der organischen Chemie, volume XIV/1, Makromolekulare Stoffe [Macromolecular compounds], Georg-Thieme-Verlag, Stuttgart, 1961, pp. 192-208. Other anionic emulsifiers are bis(phenylsulfonic acid) ethers and their alkali metal salts or ammonium salts which carry a C4-C24 alkyl group on one or both aromatic rings. These compounds are general knowledge, from U.S. Pat. No. 4,269,749, for example, and are available commercially, as Dowfax® 2A1 (Dow Chemical Company), for example. Cationic emulsifiers are preferably quaternary ammonium halides, examples being trimethylcetylammonium chloride, methyltrioctylammonium chloride, and benzyltriethylammonium chloride, or quaternary compounds of N-C6-C20-alkylpyridines, -morpholines, or -imidazoles, an example being N-laurylpyridinium chloride.

A further subject of the invention is a process for preparing the polymer dispersion of the invention, by carrying out at least one two-stage emulsion polymerization comprising the steps of:
1) preparing a polymer A by a radical polymerization from a 1st composition comprising
   A) at least one monomer,
   B) at least one anionic copolymerizable emulsifier,
2) admixing the polymer A prepared at 1) with a base,
3) in the presence of the polymer A treated at 2), preparing a polymer B by radical polymerization from a 2nd composition comprising
   A) at least one monomer,
   B) at least one anionic copolymerizable emulsifier.

In the process, at least one of the following monomers A1), A2) and/or A3) may be used as A):

A1) (cyclo)alkyl (meth)acrylates, vinylaromatic, radically polymerizable compound, crosslinkers and/or α,β-ethylenically unsaturated carboxamide.

This includes preferably those (cyclo)alkyl (meth)acrylates whose linear, cyclic and/or branched alkyl radical has 1 to 20 carbon atoms, more preferably 1 to 10, very preferably 1 to 8, and more particularly 1 to 4 carbon atoms. In the case of cyclic compounds, the alkyl radical has at least 3 carbon atoms.

Examples of (cyclo)alkyl (meth)acrylates are methyl (meth)acrylate, allyl (meth)acrylate, ethyl (meth)acrylate, n-propyl (meth)acrylate, n-butyl (meth)acrylate, isobutyl (meth)acrylate, sec-butyl (meth)acrylate, tert-butyl (meth)acrylate, n-pentyl (meth)acrylate, isopentyl (meth)acrylate, 2-methylbutyl (meth)acrylate, amyl (meth)acrylate, 2,3-epoxypropyl methacrylate, n-hexyl (meth)acrylate, 2-ethylbutyl (meth)acrylate, pentyl (meth)acrylate, n-heptyl (meth) acrylate, n-octyl (meth)acrylate, 2-ethylhexyl (meth) acrylate (2-ethylhexyl acrylate), 2-propylheptyl (meth) acrylate, n-decyl (meth)acrylate, undecyl (meth)acrylate, and n-dodecyl (meth)acrylate and cyclohexyl (meth)acrylate.

Preference is given to methyl methacrylate, methyl acrylate, ethyl acrylate, n-butyl acrylate, n-butyl methacrylate, n-hexyl acrylate, n-octyl acrylate, 2-ethylhexyl acrylate, allyl methacrylate, allyl acrylate, 2,3-epoxypropyl (meth) acrylate, and 3-propylheptyl acrylate, or mixtures thereof.

Preferably included are vinylaromatics having up to 20 C atoms.

Vinylaromatic compounds contemplated include vinyltoluene, vinylnapthalene, α- and p-methylstyrene, α-butylstyrene, 4-n-butylstyrene, 4-n-decylstyrene, and preferably styrene and α-methylstyrene.

The at least one radically polymerizable compound is selected from the group consisting of ethylenically unsaturated nitriles having up to 20 C atoms, vinyl esters of carboxylic acids comprising up to 20 C atoms, vinyl halides having up to 10 C atoms, and vinyl ethers of alcohols comprising from 1 to 10 C atoms, or mixtures thereof.

Examples of ethylenically unsaturated nitriles are fumaronitrile, acrylonitrile, and methacrylonitrile, preferably acrylonitrile and methacrylonitrile, and more preferably acrylonitrile. Vinyl esters of carboxylic acids having 1 to 20 C atoms are, for example, vinyl laurate, vinyl stearate, vinyl propionate, vinyl esters of Versatic acid, vinyl butyrate, and vinyl acetate, preferably vinyl acetate. The vinyl halides are chloro-, fluoro-, or bromo-substituted ethylenically unsaturated compounds, preferably vinyl chloride and vinylidene chloride.

Crosslinkers are compounds which have at least two radically polymerizable double bonds, preferably 2 to 6, more preferably 2 to 4, very preferably 2 to 3, and more particularly precisely 2.

Examples that may be given of di- and poly(meth)acrylates are 1,2-, 1,3-, and 1,4-butanediol diacrylate, 1,2- and 1,3-propylene glycol (meth)acrylate, 1,6-hexanediol di(meth)acrylate, 1,2-ethylene glycol di(meth)acrylate, neopentyl glycol di(meth)acrylate, diethylene glycol di(meth)acrylate, triethylene glycol di(meth)acrylate, tetraethylene glycol di(meth)acrylate, trimethylolpropane tri(meth)acrylate, trimethylolethane tri(meth)acrylate, pentaerythritol tri- and tetra(meth)acrylate.

Mention may further be made of divinylbenzene and allyl (meth)acrylate.

The α,β-ethylenically unsaturated carboxamide is selected from the group consisting of (meth)acrylamide, crotonamide, amides of dicarboxylic acids, or mixtures thereof. Particular preference is given to itaconamide, maleimide, or fumaramide; especially preferred are methacrylamide and acrylamide.

Also suitable in particular are mixtures of the (cyclo)alkyl (meth)acrylates, vinylaromatics, radically polymerizable compounds, crosslinkers and/or α,β-ethylenically unsaturated carboxamides.

A2) at least one α,β-ethylenically unsaturated carboxylic acid

These are α,β-ethylenically unsaturated carboxylic acids having 3 to 10, preferably 3 to 6, more preferably 3 to 4 carbon atoms. The ionic groups may optionally also be present in latent form, as in maleic anhydride, for example, where the acid functionality is present in the form of an anhydride group.

Preferred are (meth)acrylic acid, crotonic acid, or dicarboxylic acids, e.g., itaconic acid, maleic acid, or fumaric acid, more preferably methacrylic acid and acrylic acid, or else mixtures thereof.

(Meth)acrylic (acid) in this description stands for methacrylic (acid) and acrylic (acid).

The compounds A3) are selected from the group consisting of 2-(2-oxoimidazolidin-1-yl)ethyl (meth)acrylate, 2-ureidoethyl (meth)acrylate (UMA), acetoacetoxyethyl acrylate, acetoacetoxypropyl methacrylate, acetoacetoxybutyl methacrylate, 2-(acetoacetoxy)ethyl methacrylate (AAEMA), diacetoneacrylamide (DAAM), diacetonemethacrylamide, or mixtures thereof.

Preference is given to a process of the invention for preparing a polymer dispersion, by
  carrying out at least one two-stage emulsion polymerization, comprising the steps of:
  1) preparing a polymer A in dispersion in water, in aqueous medium, by a radical polymerization from a first composition, the first composition comprising
    A1) at least one (cyclo)alkyl (meth)acrylate,
    A2) at least one α,β-ethylenically unsaturated carboxylic acid,
    A3) at least one compound selected from the group consisting of 2-(2-oxoimidazolidin-1-yl)ethyl (meth)acrylate, 2-ureidoethyl (meth)acrylate (UMA), acetoacetoxyethyl acrylate, acetoacetoxypropyl methacrylate, acetoacetoxybutyl methacrylate, 2-(acetoacetoxy)ethyl methacrylate, diacetoneacrylamide (DAAM), diacetonemethacrylamide, or mixtures thereof, and
    A4) at least one chain transfer agent, and
    B) at least one anionic copolymerizable emulsifier,
  2) admixing the polymer A prepared at 1) with a base,
  3) in the presence of the polymer A treated at 2), preparing a polymer B by radical polymerization from a second composition, the second composition comprising
    A1) at least one (cyclo) alkyl (meth)acrylate and
    B) at least one anionic copolymerizable emulsifier.

As monomer it is possible to use the compounds identified above under A1) to A3).

Preference is given to a process of the invention for preparing a polymer dispersion, wherein the at least one anionic copolymerizable emulsifier is selected from the group consisting of
  (1) a compound of formula (I)

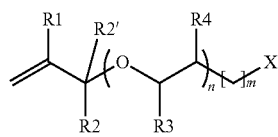

where
R1 is H, alkyl, cycloalkyl, aralkyl, aryl, or alkoxyaryl,
R2, R2' is H or R2 and R2' are O,
R3 is H or alkyl,
R4 is H or OH,
X is $SO_3^-$, $HPO_4^-$, $PO_4^{2-}$, or $COO^-$,
m is 0 or 1, and
n is an integer between 1 and 1000; preferably 1 to 500, very preferably 4 to 50;

(2) a compound of formula (II)

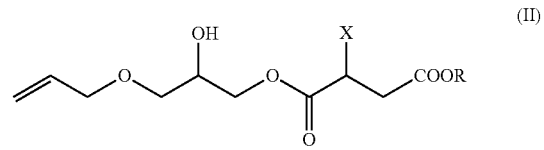

where
X is $SO_3^-$, $PO_4^{2-}$, or $SO_4^-$, and
R is H, alkyl, cycloalkyl, aralkyl, aryl or alkoxyaryl;

(3) a compound of formula (III)

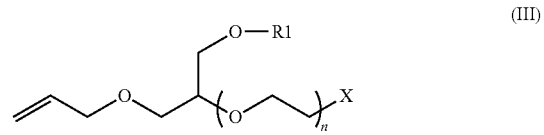

where
R1 is H, alkyl, cycloalkyl, aralkyl, aryl or alkoxyaryl,
X is $SO_4^-$, $SO_3^-$, $HPO_4^-$, $PO_4^{2-}$, or $COO^-$, and
n is an integer between 1 and 1000; preferably 1 to 500, very preferably 4 to 50;

(4) a compound of the formula (IV)

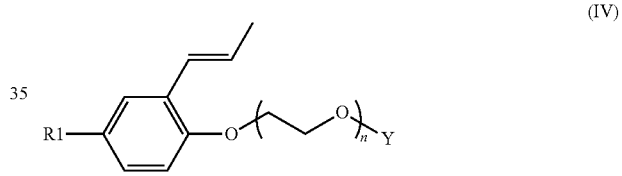

where
R1 is H, alkyl, cycloalkyl, aralkyl, aryl, or alkoxyaryl,
Y is $SO_3^-$, $PHO_3^-$, or $PO_3^{2-}$, and
n is an integer between 1 and 1000; preferably 1 to 500, very preferably 4 to 50;

or mixtures of the compounds of the formulae (I) to (IV).

Radicals R1, R2, R3, X, and Y, and also m and n, used with preference have been identified above.

A further subject of the invention relates to coating materials in the form of an aqueous composition comprising
  i) at least one polymer dispersion of the invention,
  ii) optionally at least one (in)organic filler and/or (in)organic pigment,
  iii) optionally an additive,
  iv) water.

The coating material of the invention is employed preferably in aqueous paints and varnishes. These paints and varnishes take the form, for example, of an unpigmented system (clearcoat or clear varnish) or of a pigmented system. The fraction of the pigments may be described by the pigment volume concentration (PVC). The PVC describes the ratio of the volume of pigments ($V_P$) and fillers ($V_F$) to the total volume, consisting of the volumes of binder ($V_B$), pigments, and fillers, of a dried coating film, in percent: $PVC=(V_P+V_F)\times 100/(V_P+V_F+V_B)$. Paints and varnishes can be distinguished on the basis of the PVC, for example, as follows:

highly filled interior paint, wash resistant, white/matt about 85
interior paint, scrub resistant, white/matt about 80
semigloss paint, silk-matt about 35
semigloss paint, silk-gloss about 25
high-gloss paint about 15-25
exterior architectural paint, white about 45-55
clear varnish <5

These dispersions are used preferably at PVC<50, more preferably PVC<35, and more preferably still in systems with low filler content (PVC<23) and in clear varnishes (PVC<5).

Suitable fillers in clear varnish systems are, for example, matting agents, which as desired greatly detract from the gloss. Matting agents are generally transparent and may be organic or inorganic. Inorganic fillers based on silica are most suitable and are widely available commercially. Examples are the Syloid® products from W.R. Grace & Company and the Acematt® products from Evonik GmbH. Organic matting agents are available, for example, from BYK-Chemie GmbH under the Ceraflour® and Ceramat® brands, and from Deuteron GmbH under the Deuteron MK® brand. Other suitable fillers for emulsion paints are aluminosilicates, such as feldspars, silicates, such as kaolin, talc, mica, magnesite, alkaline earth metal carbonates, such as calcium carbonate, in the form of calcite or chalk, for example, magnesium carbonate, dolomite, alkaline earth metal sulfates, such as calcium sulfate, silicon dioxide, etc. In paints and varnishes, naturally, finely divided fillers are preferred. The fillers may be used as individual components. In the art, however, filler mixtures have proven particularly appropriate, examples being calcium carbonate/kaolin, calcium carbonate/talc. Glossy paints and varnishes generally only have small amounts of very finely divided fillers, or comprise no fillers.

Finely divided fillers may also be used for increasing the hiding power and/or for saving on white pigments. For setting of the hiding power, the hue and the depth of color, preference is given to using blends of color pigments and fillers.

Suitable pigments are, for example, inorganic white pigments such as titanium dioxide, preferably in the rutile form, barium sulfate, zinc oxide, zinc sulfide, basic lead carbonate, antimony trioxide, lithopone (zinc sulfide+barium sulfate), or colored pigments, examples being iron oxides, carbon black, graphite, zinc yellow, zinc green, ultramarine, manganese black, antimony black, manganese violet, Paris blue or Schweinfurt green. Besides the inorganic pigments, the emulsion paints of the invention may also comprise organic color pigments, examples being sepia, gamboges, Cassel brown, toluidine red, para red, Hansa yellow, indigo, azo dyes, anthraquinonoid and indigoid dyes, and also dioxazine, quinacridone, phthalocyanine, isoindolinone, and metal-complex pigments. Also suitable are synthetic white pigments with air inclusions to increase light scattering, such as the Ropaque® and AQACell® dispersions. Additionally suitable are the Luconyl® products from BASF SE, such as Luconyl® yellow, Luconyl® brown, and Luconyl® red, especially the transparent variants.

Besides the polymer dispersion, the coating material of the invention, also called aqueous paint or varnish, may optionally comprise additional, film-forming polymers, pigments, and other additives.

The customary additives (auxiliaries) include wetting or dispersing agents, such as sodium, potassium, or ammonium polyphosphates, alkali metal and ammonium salts of acrylic acid or maleic anhydride copolymers, polyphosphonates, such as sodium 1-hydroxyethane-1,1-diphosphonate, and also salts of naphthalenesulfonic acids, more particularly their sodium salts.

Important additives are the film-forming auxiliaries, the thickeners, and defoamers. Examples of suitable film-forming auxiliaries are Texanol® from Eastman Chemicals, and the glycol ethers and glycol esters available commercially, for example, from BASF SE, under the names Solvenon® and Lusolvan®, and from Dow under the tradename Dowanol®. The amount is preferably <10 wt % and more preferably <5 wt %, based on the total formulation. It is also possible to carry out formulation entirely without solvents.

Further suitable additives are flow control agents, defoamers, biocides, and thickeners. Examples of suitable thickeners are associative thickeners, such as polyurethane thickeners. The amount of the thickener is preferably less than 2.5 wt %, more preferably less than 1.5 wt %, of thickener, based on the solids content of the paint or varnish. Further formulating information for wood coatings is described at length in "water-based acrylates for decorative coatings" by the authors M. Schwartz and R. Baumstark, ISBN 3-87870-726-6.

A further subject of the present invention is the use of the polymer dispersion of the invention for coating compositions.

A further subject of the present invention is the use of the polymer dispersion of the invention for paints and varnishes.

The paints and varnishes of the invention are produced in a known way by blending the components in mixing equipment customary for the purpose. It has proven appropriate to make an aqueous paste or dispersion from the pigments, the water, and optionally the additives, and only then to mix the polymeric binder—that is, generally, the aqueous dispersion of the polymer—with the pigment paste or pigment dispersion.

The paint or varnish of the invention may be applied to substrates in a customary way, by means of spreading, spraying, dipping, rolling and/or knifecoating, for example.

The paints and varnishes of the invention are distinguished by ease of handling and good working properties. The paints and varnishes have a low pollutant content. They have good performance properties, exemplified by good water resistance, good wet adhesion, and good blocking resistance; they are easily recoated, and on application they display good flow. The equipment used is easily cleaned with water.

All embodiments and preferred embodiments set out above can be combined freely with one another, unless the context clearly dictates otherwise.

In particular, the expression "comprising", or the expression "comprises", encompasses the expressions "consisting" or "consisting of".

Further advantages and advantageous embodiments of the subjects of the invention are illustrated by FIG. 1 and elucidated in the description hereinafter. It should be borne in mind here that the drawing is merely descriptive in nature and is not intended to restrict the invention in any form whatsoever. In the drawing:

FIG. 1 shows wet drawdowns onto a Leneta film of the formulation according to the invention.

FIG. 1 shows five different wet drawdowns onto a Leneta film of the formulation according to the invention, comprising acrylate thickeners and the polymer dispersions 1E1 to 1E3 of the invention, in comparison to binders from WO 2012/130712-A1 (CE1 and CE2). It can be seen that the formulations based on the polymer dispersions of the invention exhibit wet transparency.

The invention is elucidated in more detail by the examples hereinafter.

INVENTIVE EXAMPLE 1 (IE1)

A polymerization vessel equipped with metering devices and temperature regulation was charged at 20 to 25° C. (room temperature) under a nitrogen atmosphere with 732.6 g of deionized water and 18.5 g of Adeka Reasoap SR-1025 (25 wt % aqueous solution)

and this initial charge was heated to 80° C. with stirring. When this temperature had been reached, the entire feed 1 was added and stirring took place for 2 minutes. Thereafter feed 2 was commenced and was metered in over the course of 45 minutes. After the end of feed 2, polymerization was continued for 10 minutes, then feed 3 was added and stirred in for 10 minutes. Subsequently feed 4 was commenced. When 50% of this feed had been metered in, over 45 minutes, the feed was stopped, and feed 5 was added and stirred in for 10 minutes. Then the remainder of feed 4 and, in parallel therewith, feed 6 were metered in over the course of 45 minutes.

Feed 1 (homogeneous solution of):
55.8 g of deionized water and
4.2 g of sodium peroxodisulfate
Feed 2 (homogeneous mixture of):
196.1 g of deionized water
6.2 g of Adeka Reasoap SR-1025 (25 wt % aqueous solution)
45.5 g of methacrylic acid
18.2 g of a 25 wt % strength solution of ureidoethyl methacrylate in methyl methacrylate
300.3 g of methyl methacrylate
45.5 g of n-butyl acrylate
227.5 g of a 20 wt % strength aqueous solution of diacetoneacrylamide, and
22.8 g of 2-ethylhexyl thioglycolate
Feed 3:
27.0 g of a 25 wt % strength ammonia solution
Feed 4 (homogeneous mixture of):
396.1 g of deionized water
10.6 g of Adeka Reasoap SR-1025 (25 wt % aqueous solution)
280.0 g of n-butyl acrylate
343.0 g of methyl methacrylate, and
322.0 g of 2-ethylhexyl acrylate
Feed 5:
9.0 g of a 25 wt % strength ammonia solution
Feed 6 (homogeneous solution of):
9.3 g of deionized water and
0.7 g of sodium peroxodisulfate After the end of feeds 4 and 6, the polymerization mixture was left to react further at 80° C. for 30 minutes; then 167.2 g of deionized water were added and stirring was carried out at 80° C. for 90 minutes more.

The aqueous polymer dispersion obtained was then cooled to room temperature. At room temperature, 189.6 g of a 12 wt % strength aqueous solution of adipic dihydrazide were added. Lastly, the dispersion was filtered through a 125 µm filter.

The resulting 3430.4 g of the aqueous polymer dispersion had a solids content of 42.6 wt %, the MFFT was ≤0° C. On dilution with deionized water, the aqueous polymer dispersion has a weight-average particle diameter of 41 nm (measured by means of HDC).

INVENTIVE EXAMPLE 2 (IE2)

A polymerization vessel equipped with metering devices and temperature regulation was charged at 20 to 25° C. (room temperature) under a nitrogen atmosphere with 732.6 g of deionized water and 18.5 g of Adeka Reasoap SR-1025 (25 wt % aqueous solution)

and this initial charge was heated to 80° C. with stirring. When this temperature had been reached, the entire feed 1 was added and stirring took place for 2 minutes. Thereafter feed 2 was commenced and was metered in over the course of 45 minutes. After the end of feed 2, polymerization was continued for 10 minutes, then feed 3 was added and stirred in for 10 minutes. Subsequently feed 4 was commenced. When 50% of this feed had been metered in, over 45 minutes, the feed was stopped, and feed 5 was added and stirred in for 10 minutes. Then the remainder of feed 4 and, in parallel therewith, feed 6 were metered in over the course of 45 minutes.

Feed 1 (homogeneous solution of):
55.8 g of deionized water and
4.2 g of sodium peroxodisulfate
Feed 2 (homogeneous mixture of):
196.1 g of deionized water
6.2 g of Adeka Reasoap SR-1025 (25 wt % aqueous solution)
45.5 g of methacrylic acid
18.2 g of a 25 wt % strength solution of ureidoethyl methacrylate in methyl methacrylate
300.3 g of methyl methacrylate
45.5 g of n-butyl acrylate
227.5 g of a 20 wt % strength aqueous solution of diacetoneacrylamide, and
21.0 g of 2-ethylhexyl thioglycolate
Feed 3:
27.0 g of a 25 wt % strength ammonia solution
Feed 4 (homogeneous mixture of):
396.1 g of deionized water
10.6 g of Adeka Reasoap SR-1025 (25 wt % aqueous solution)
280.0 g of n-butyl acrylate
7.0 g of allyl methacrylate
336.0 g of methyl methacrylate, and
322.0 g of 2-ethylhexyl acrylate
Feed 5:
9.0 g of a 25 wt % strength ammonia solution
Feed 6 (homogeneous solution of):
9.3 g of deionized water and
0.7 g of sodium peroxodisulfate After the end of feeds 4 and 6, the polymerization mixture was left to react further at 80° C. for 30 minutes; then 167.2 g of deionized water were added and stirring was carried out at 80° C. for 90 minutes more.

The aqueous polymer dispersion obtained was then cooled to room temperature. At room temperature, 189.6 g of a 12 wt % strength aqueous solution of adipic dihydrazide were added. Lastly, the dispersion was filtered through a 125 µm filter.

The resulting 3425.9 g of the aqueous polymer dispersion had a solids content of 42.5 wt %, the MFFT was ≤0° C. On dilution with deionized water, the aqueous polymer dispersion has a weight-average particle diameter of 40 nm (measured by means of HDC).

INVENTIVE EXAMPLE 3 (IE3)

A polymerization vessel equipped with metering devices and temperature regulation was charged at 20 to 25° C. (room temperature) under a nitrogen atmosphere with
  732.6 g of deionized water and
  18.5 g of Adeka Reasoap SR-1025 (25 wt % aqueous solution)
and this initial charge was heated to 80° C. with stirring. When this temperature had been reached, the entire feed 1 was added and stirring took place for 2 minutes. Thereafter feed 2 was commenced and was metered in over the course of 45 minutes. After the end of feed 2, polymerization was continued for 10 minutes, then feed 3 was added and stirred in for 10 minutes. Subsequently feed 4 was commenced. When 50% of this feed had been metered in, over 45 minutes, the feed was stopped, and feed 5 was added and stirred in for 10 minutes. Then the remainder of feed 4 and, in parallel therewith, feed 6 were metered in over the course of 45 minutes.

Feed 1 (homogeneous solution of):
  55.8 g of deionized water and
  4.2 g of sodium peroxodisulfate
Feed 2 (homogeneous mixture of):
  196.1 g of deionized water
  6.2 g of Adeka Reasoap SR-1025 (25 wt % aqueous solution)
  45.5 g of methacrylic acid
  28.0 g of a 25 wt % strength solution of ureidoethyl methacrylate in methyl methacrylate
  290.5 g of methyl methacrylate
  45.5 g of n-butyl acrylate
  227.5 g of a 20 wt % strength aqueous solution of diacetoneacrylamide, and
  21.0 g of 2-ethylhexyl thioglycolate
Feed 3:
  27.0 g of a 25 wt % strength ammonia solution
Feed 4 (homogeneous mixture of):
  396.1 g of deionized water
  10.6 g of Adeka Reasoap SR-1025 (25 wt % aqueous solution)
  280.0 g of n-butyl acrylate
  343.0 g of methyl methacrylate, and
  322.0 g of 2-ethylhexyl acrylate
Feed 5:
  9.0 g of a 25 wt % strength ammonia solution
Feed 6 (homogeneous solution of):
  9.3 g of deionized water and
  0.7 g of sodium peroxodisulfate After the end of feeds 4 and 6, the polymerization mixture was left to react further at 80° C. for 30 minutes; then 167.2 g of deionized water were added and stirring was carried out at 80° C. for 90 minutes more.

The aqueous polymer dispersion obtained was then cooled to room temperature. At room temperature, 189.6 g of a 12 wt % strength aqueous solution of adipic dihydrazide were added. Lastly, the dispersion was filtered through a 125 µm filter.

The resulting 3425.9 g of the aqueous polymer dispersion had a solids content of 42.5 wt %, the MFFT was ≤0° C. On dilution with deionized water, the aqueous polymer dispersion has a weight-average particle diameter of 40 nm (measured by means of HDC).

COMPARATIVE EXAMPLE 1 (CE1)

A polymerization vessel equipped with metering devices and temperature regulation was charged at 20 to 25° C. (room temperature) under a nitrogen atmosphere with
  289.6 g of deionized water and
  32.0 g of a 15 wt % strength aqueous solution of sodium lauryl sulfate
and this initial charge was heated to 80° C. with stirring. When this temperature had been reached, the entire feed 1 was added and stirring took place for 2 minutes. Thereafter feed 2 was commenced and was metered in over the course of 40 minutes. After the end of feed 2, polymerization was continued for 10 minutes, then 0.8 g of a 25 wt % strength aqueous solution of ammonia was added and was stirred in for 10 minutes. Subsequently feed 3 was commenced and was metered in continuously at constant flow rate over the course of 90 minutes. 45 minutes after the start of feed 3, 0.8 g of a 25 wt % strength ammonia solution was added.

Feed 1 (homogeneous solution of):
  31.9 g of deionized water and
  2.4 g of sodium peroxodisulfate
Feed 2 (homogeneous mixture of):
  60.1 g of deionized water
  4.0 g of a 15 wt % strength aqueous solution of sodium lauryl sulfate
  7.2 g of methacrylic acid
  54.0 g of a 15 wt % strength aqueous solution of methacrylamide
  18.0 g of styrene
  101.6 g of methyl methacrylate
  21.0 g of n-butyl acrylate
  9.7 g of a 25 wt % strength solution of ureido ethyl methacrylate in methyl methacrylate
  72.0 g of a 20 wt % strength aqueous solution of diacetoneacrylamide, and
  2.9 g of 2-ethylhexyl thioglycolate
Feed 3 (homogeneous mixture of):
  175.3 g of deionized water
  8.0 g of a 15 wt % strength aqueous solution of sodium lauryl sulfate
  288.0 g of n-butyl acrylate
  60.0 g of n-butyl methacrylate, and
  72.0 g of methyl methacrylate After the end of feed 3, the polymerization mixture was allowed to continue reacting at 80° C. for 90 minutes. Then 2.5 g of a 25 wt % strength ammonia solution were added and were stirred in for 15 minutes.

The aqueous polymer dispersion obtained was then cooled to room temperature. At a temperature below 40° C., 60 g of a 12 wt % strength aqueous solution of adipic dihydrazide were added. Lastly, the dispersion was filtered through a 125 µm filter.

The resulting 1373.8 g of the aqueous polymer dispersion had a solids content of 43.6 wt %, the MFFT was ≤0° C. On dilution with deionized water, the aqueous polymer dispersion has a weight-average particle diameter of 67 nm.

COMPARATIVE EXAMPLE 2 (CE2)

A polymerization vessel equipped with metering devices and temperature regulation was charged at 20 to 25° C. (room temperature) under a nitrogen atmosphere with
  701.3 g of deionized water and
  30.8 g of a 15 wt % strength aqueous solution of sodium lauryl sulfate and this initial charge was heated to 80° C. with stirring. When this temperature had been reached, the entire feed 1 was added and stirring took place for 2 minutes. Thereafter feed 2 was commenced and was metered in over the course of 40 minutes. After the end of feed 2, polymerization was continued for 10 minutes, then 1.9 g of a 25 wt % strength aqueous solution of ammonia were added and were stirred in for 10 minutes. Subsequently feed 3 was commenced and was metered in continuously at constant flow rate over the course of 90 minutes. 45 minutes after the start of feed 3, 1.9 g of a 25 wt % strength ammonia solution were added, and feed 4 was commenced and was metered in continuously with a constant flow rate in parallel with the remainder of feed 3.

Feed 1 (homogeneous solution of):
65.1 g of deionized water and
4.9 g of sodium peroxodisulfate
Feed 2 (homogeneous mixture of):
140.1 g of deionized water
9.3 g of a 15 wt % strength aqueous solution of sodium lauryl sulfate
16.8 g of methacrylic acid
126.0 g of a 15 wt % strength aqueous solution of methacrylamide
42.0 g of styrene
237.2 g of methyl methacrylate
49.0 g of n-butyl acrylate
22.5 g of a 25 wt % strength solution of ureido ethyl methacrylate in methyl methacrylate
168.0 g of a 20 wt % strength aqueous solution of diacetoneacrylamide, and
11.2 g of 2-ethylhexyl thioglycolate
Feed 3 (homogeneous mixture of):
404.0 g of deionized water
9.3 g of a 15 wt % strength aqueous solution of sodium lauryl sulfate
315.0 g of n-butyl acrylate
266.0 g of 2-ethylhexyl acrylate
140.0 g of n-butyl methacrylate, and
259.0 g of methyl methacrylate
Feed 4 (homogeneous solution of):
9.3 g of deionized water and
0.7 g of sodium peroxodisulfate After the end of feeds 3 and 4, the polymerization mixture was allowed to continue reacting at 80° C. for 90 minutes. Then 5.9 g of a 25 wt % strength ammonia solution were added and were stirred in for 15 minutes.

The aqueous polymer dispersion obtained was then cooled to room temperature. At a temperature below 40° C., 140 g of a 12 wt % strength aqueous solution of adipic dihydrazide were added. Lastly, the dispersion was filtered through a 125 μm filter.

The resulting 3177.2 g of the aqueous polymer dispersion had a solids content of 42.8 wt %, the MFFT was ≤0° C. On dilution with deionized water, the aqueous polymer dispersion has a weight-average particle diameter of 77 nm.

COMPARATIVE EXAMPLE 3 (CE3)

A polymerization vessel equipped with metering devices and temperature regulation was charged at 20 to 25° C. (room temperature) under a nitrogen atmosphere with
721.0 g of deionized water and
30.8 g of a 15 wt % strength aqueous solution of sodium lauryl sulfate and this initial charge was heated to 80° C. with stirring. When this temperature had been reached, the entire feed 1 was added and stirring took place for 2 minutes. Thereafter feed 2 was commenced and was metered in over the course of 45 minutes. After the end of feed 2, polymerization was continued for 10 minutes, then feed 3 was added and stirred in for 10 minutes. Subsequently feed 4 was commenced. When 50% of this feed had been metered in, over 45 minutes, the feed was stopped, and feed 5 was added and stirred in for 10 minutes. Then the remainder of feed 4 and, in parallel therewith, feed 6 were metered in over the course of 45 minutes.

Feed 1 (homogeneous solution of):
55.8 g of deionized water and
4.2 g of sodium peroxodisulfate
Feed 2 (homogeneous mixture of):
191.4 g of deionized water
10.3 g of a 15 wt % strength aqueous solution of sodium lauryl sulfate
45.5 g of methacrylic acid
18.2 g of a 25 wt % strength solution of ureidoethyl methacrylate in methyl methacrylate
300.3 g of methyl methacrylate
45.5 g of n-butyl acrylate
227.5 g of a 20 wt % strength aqueous solution of diacetoneacrylamide, and
22.8 g of 2-ethylhexyl thioglycolate
Feed 3:
27.0 g of a 25 wt % strength ammonia solution
Feed 4 (homogeneous mixture of):
388.9 g of deionized water
17.7 g of a 15 wt % strength aqueous solution of sodium lauryl sulfate
280.0 g of n-butyl acrylate
343.0 g of methyl methacrylate, and
322.0 g of 2-ethylhexyl acrylate
Feed 5:
9.0 g of a 25 wt % strength ammonia solution
Feed 6 (homogeneous solution of):
9.3 g of deionized water and
0.7 g of sodium peroxodisulfate After the end of feeds 4 and 6, the polymerization mixture was left to react further at 80° C. for 30 minutes; then 167.2 g of deionized water were added and stirring was carried out at 80° C. for 90 minutes more.

The aqueous polymer dispersion obtained was then cooled to room temperature. At room temperature, 189.6 g of a 12 wt % strength aqueous solution of adipic dihydrazide were added. Lastly, the dispersion was filtered through a 125 μm filter.

The resulting 3427.7 g of the aqueous polymer dispersion had a solids content of 42.6 wt %, the MFFT was ≤0° C. On dilution with deionized water, the aqueous polymer dispersion has a weight-average particle diameter of 39 nm (measured by means of HDC).

COMPARATIVE EXAMPLE 4 (CE4)

A polymerization vessel equipped with metering devices and temperature regulation was charged at 20 to 25° C. (room temperature) under a nitrogen atmosphere with
728.0 g of deionized water and
23.1 g of a 20 wt % strength aqueous solution of isotridecanol ethoxylate[1]

and this initial charge was heated to 80° C. with stirring. When this temperature had been reached, the entire feed 1 was added and stirring took place for 2 minutes. Thereafter feed 2 was commenced and was metered in over the course of 45 minutes. After the end of feed 2, polymerization was continued for 10 minutes, then feed 3 was added and stirred in for 10 minutes. Subsequently feed 4 was commenced. When 50% of this feed had been metered in, over 45 minutes, the feed was stopped, and feed 5 was added and stirred in for 10 minutes. Then the remainder of feed 4 and, in parallel therewith, feed 6 were metered in over the course of 45 minutes.

Feed 1 (homogeneous solution of):
55.8 g of deionized water and
4.2 g of sodium peroxodisulfate
Feed 2 (homogeneous mixture of):
194.6 g of deionized water
7.7 g of a 20 wt % strength aqueous solution of isotridecanol ethoxylate[1)]
45.5 g of methacrylic acid
18.2 g of a 25 wt % strength solution of ureidoethyl methacrylate in methyl methacrylate
300.3 g of methyl methacrylate
45.5 g of n-butyl acrylate
227.5 g of a 20 wt % strength aqueous solution of diacetoneacrylamide, and
22.8 g of 2-ethylhexyl thioglycolate
Feed 3:
27.0 g of a 25 wt % strength ammonia solution
Feed 4 (homogeneous mixture of):
393.3 g of deionized water
13.3 g of a 20 wt % strength aqueous solution of isotridecanol ethoxylate[1)]
280.0 g of n-butyl acrylate
343.0 g of methyl methacrylate, and
322.0 g of 2-ethylhexyl acrylate
Feed 5:
9.0 g of a 25 wt % strength ammonia solution
Feed 6 (homogeneous solution of):
9.3 g of deionized water and
0.7 g of sodium peroxodisulfate After the end of feeds 4 and 6, the polymerization mixture was left to react further at 80° C. for 30 minutes; then 167.2 g of deionized water were added and stirring was carried out at 80° C. for 90 minutes more.

The aqueous polymer dispersion obtained was then cooled to room temperature. At room temperature, 189.6 g of a 12 wt % strength aqueous solution of adipic dihydrazide were added. Lastly, the dispersion was filtered through a 125 µm filter.

The resulting 3427.6 g of the aqueous polymer dispersion had a solids content of 42.6 wt %, the MFFT was ≤0° C. On dilution with deionized water, the aqueous polymer dispersion has a weight-average particle diameter of 43 nm (measured by means of HDC).

1) Such as Lutensol TO 82 from BASF SE
Formulations
Both stains and paints were formulated.
Wet transparency was assessed on stains: drawn down with a wet film thickness of 300 µm onto Leneta film. Rating with school grades: 1=very good, transparent, 5=very poor, opaque.
Whitening: drawn down onto a glass plate with a wet film thickness of 300 µm is a film of the stain under test. Measurement may then take place after a drying time of 3 days at RT. The glass plates are placed into a glass beaker filled with about 400 ml of DI H2O, and assessed visually after 45 minutes. Evaluation: 0=no whitening, 1=a trace of whitening, 2=slight whitening, 3=moderate whitening, 4=severe whitening, 5=total whitening.

Water absorption: Apply the paint under test to a Teflon-coated substrate. The slot size for application is to be selected so as to form a film with a dry thickness of approximately 400 µm. After the film has dried, it is detached from the substrate and stored in free suspension or lying on a rack at room temperature for at least 3 days. Punch out 3 test specimens in each case, measuring 50×40 mm, and store them again at RT for at least 4 days, determine their weight using an analytical balance, and place between steel mesh baskets so that the film is neither lying on the base nor is able to float, and is wetted by water from all sides. After 24 hours of storage in the water chest filled with deionized water, remove test specimens, dry them off, and immediately reweigh them on the analytical balance. Evaluation: Water absorption=[(final WA mass−initial mass)/initial mass]×100%.

Capillary water absorption both on dried stains and paints:
Test instrument: Erichsen film drawer 400 µm 10 cm wide.
Test materials: pine block (30×10×2 cm), 150 ml beaker.
Procedure: The paint under test is drawn down onto the pine block using the Erichsen film drawer. After drying for at least one day, the block is cut up into three equal-sized sections (approximately 10×10×2 cm) and dried for a total of 7 days. After the drying time, the test specimens are weighed (0 value). Thereafter the coated side of the test specimen is pressed onto the opening of the filled beakers and turned. Now the uncoated side should be pointing downward, and the water in the beaker should be in contact with the coated side of the test specimen. After 3 days of water contact time, remove the test specimens (beaker away and dry off) and re-weigh the test specimens.
Pendulum hardness: Films with a wet thickness of 300 µm were drawn onto glass and dried at room temperature for 7 days. The hardness was determined according to EN ISO 1522 (December 2006).

Formulation of stain 1

| Deionized water | | 130 |
|---|---|---|
| Tego Foamex 810 | Defoamer from Evonik Industries AG | 4 |
| Proglyde DMM | Film-forming assistant from Dow | 10 |
| Butyl diglycol | Film-forming assistant | 10 |
| Tinuvin 1130 | Light stabilizer from BASF SE | 5 |
| Acematt TS 100 | Matting agent from Evonik Industries AG | 10 |
| Ammonia | Neutralizing agent (25 wt %) | 3 |
| Coatex BR 100 | Thickener from Arkema | 1 |
| BYK 348 | Wetting agent from Byk-Chemie GmbH | 5 |
| Thixol 53 L | Acrylate thickener from Arkema Inc. | 37 |
| Tego Antifoam 1488 | Defoamer from Evonik Industries AG | 2 |
| Deionized water | | 17 |
| Dispersion | 42.5 wt % | 755 |
| Deionized water | | 11 |
| Total | | 1000 |

Formulation of stain 2

| Deionized water | | 65 |
|---|---|---|
| Rheovis HS 1169 | Polyacrylate thickener from BASF SE | 9 |
| Hydropalat WE 3240 | Wetting agent from BASF SE | 5 |

-continued

| | | |
|---|---|---|
| Tego Foamex 810 | Defoamer from Evonik Industries AG | 5 |
| Texanol | Film-forming assistant from Dow | 6 |
| Butyl diglycol | Film-forming assistant | 18 |
| Tinuvin 1130 | Light stabilizer from BASF SE | 5 |
| Talc HCIT Extra | Matting agent from R2 Group, Denmark | 10 |
| Ammonia | Neutralizing agent (25 wt %) | 2 |
| Rheovis PU1190 | Thickener from BASF SE | 2.5 |
| Deionized water | | 65 |
| Dispersion | 42.5 wt % | 755 |
| Tego Antifoam 1488 | Defoamer from Evonik Industries AG | 2 |
| Deionized water | | 50.5 |
| Total | | 1000 |

Formulation of the paint

| | | |
|---|---|---|
| Deionized water | | 100 |
| Tego Foamex 810 | Defoamer from Evonik Industries AG | 4 |
| Dispex CX 4231 | Dispersant from BASF SE | 10 |
| Texanol | Film-forming assistant from Eastman | 5 |
| Ethylene diglycol | | 20 |
| Ammonia | Neutralizing agent (25 wt %) | 2 |
| Tiona 595 | Titanium dioxide from Millenium Chemicals | 182 |
| Microtalc IT Extra | Magnesium silicate from Mondo Minerals B.V. | 27 |
| Acematt OK 500 | Matting agent from Evonik Industries AG | 6 |
| Thixol 53 L (3:1) | Acrylate thickener from Arkema Inc. | 5 |
| Tego Foamex 1488 | Defoamer from Evonik Industries AG | 2 |
| Dispersion | 42.5 wt % | 570 |
| Thixol 53 L (3:1) | Acrylate thickener from Arkema Inc. | 27 |
| Ammonia | Neutralizing agent (25 wt %) | 1 |
| Deionized water | | 39 |
| Total | | 1000 |

Results of the experiments

| | | IE1 | IE2 | IE3 | CE1 | CE2 | CE3 | CE4 |
|---|---|---|---|---|---|---|---|---|
| Stain 1 | Wet transparency (school grade) | 1 | 1 | 1 | 4 | 5 | | |
| | Capillary water absorption (g/m² × 3 d) | 280 | 275 | 275 | 318 | 233 | | |
| | Pendulum hardness (s) | 52 | 52 | 52 | 41 | 43 | | |
| Stain 2 | Wet transparency (school grade) | 1 | | | | | 2 | 4 |
| | Whitening after 1 h (school grade) | 2 | | | | | 2-3 | 3-4 |
| | Water absorption (24 h) (%) | 16.0 | | | | | 18.3 | 17.7 |
| | Pendulum hardness (s) | 49 | | | | | 52 | 46 |
| Paint | Capillary water absorption (g/m² × 3 d) | 203 | 198 | 198 | 250 | 210 | | |
| | Pendulum hardness (s) | 57 | 50 | 59 | 42 | 48 | | |

INVENTIVE EXAMPLE 4 (IE4)

A polymerization vessel equipped with metering devices and temperature regulation was charged at 20 to 25° C. (room temperature) under a nitrogen atmosphere with
  732.6 g of deionized water and
  18.5 g of Adeka Reasoap SR-1025 (25 wt % aqueous solution)
and this initial charge was heated to 80° C. with stirring. When this temperature had been reached, the entire feed 1 was added and stirring took place for 2 minutes. Thereafter feed 2 was commenced and was metered in over the course of 45 minutes. After the end of feed 2, polymerization was continued for 10 minutes, then feed 3 was added and stirred in for 10 minutes. Subsequently feed 4 was commenced. When 50% of this feed had been metered in, over 45 minutes, the feed was stopped, and feed 5 was added and stirred in for 10 minutes. Then the remainder of feed 4 and, in parallel therewith, feed 6 were metered in over the course of 45 minutes.

Feed 1 (homogeneous solution of):
  55.8 g of deionized water and
  4.2 g of sodium peroxodisulfate Feed 2 (homogeneous mixture of):
  196.1 g of deionized water
  6.2 g of Adeka Reasoap SR-1025 (25 wt % aqueous solution)
  45.5 g of methacrylic acid
  18.2 g of a 25 wt % strength solution of ureidoethyl methacrylate in methyl methacrylate
  300.3 g of methyl methacrylate
  45.5 g of n-butyl acrylate
  227.5 g of a 20 wt % strength aqueous solution of diacetoneacrylamide, and
  21.0 g of 2-ethylhexyl thioglycolate Feed 3:
  27.0 g of a 25 wt % strength ammonia solution Feed 4 (homogeneous mixture of):
  396.1 g of deionized water
  10.6 g of Adeka Reasoap SR-1025 (25 wt % aqueous solution)
  658.0 g of n-butyl acrylate
  280.0 g of methyl methacrylate, and
  7.0 g of allyl methacrylate Feed 5:
  9.0 g of a 25 wt % strength ammonia solution Feed 6 (homogeneous solution of):
  9.3 g of deionized water and
  0.7 g of sodium peroxodisulfate After the end of feeds 4 and 6, the polymerization mixture was left to react further at 80° C. for 30 minutes; then 167.2 g of deionized water were added and stirring was carried out at 80° C. for 90 minutes more.

The aqueous polymer dispersion obtained was then cooled to room temperature. At room temperature, 189.6 g of a 12 wt % strength aqueous solution of adipic dihydrazide were added. Lastly, the dispersion was filtered through a 125 μm filter.

The resulting 3425.9 g of the aqueous polymer dispersion had a solids content of 42.3 wt %, the MFFT was ≤0° C. On dilution with deionized water, the aqueous polymer dispersion has a weight-average particle diameter of 42 nm (measured by means of HDC).

COMPARATIVE EXAMPLE 5—ADEKA REASOAP ONLY IN INITIAL CHARGE AND FEED 2

A polymerization vessel equipped with metering devices and temperature regulation was charged at 20 to 25° C. (room temperature) under a nitrogen atmosphere with
  732.6 g of deionized water and
  18.5 g of Adeka Reasoap SR-1025 (25 wt % aqueous solution)
and this initial charge was heated to 80° C. with stirring. When this temperature had been reached, the entire feed 1 was added and stirring took place for 2 minutes. Thereafter feed 2 was commenced and was metered in over the course of 45 minutes. After the end of feed 2, polymerization was continued for 10 minutes, then feed 3 was added and stirred in for 10 minutes. Subsequently feed 4 was commenced. When 50% of this feed had been metered in, over 45 minutes, the feed was stopped, and feed 5 was added and stirred in for 10 minutes. Then the remainder of feed 4 and, in parallel therewith, feed 6 were metered in over the course of 45 minutes.

Feed 1 (homogeneous solution of):
  55.8 g of deionized water and
  4.2 g of sodium peroxodisulfate
Feed 2 (homogeneous mixture of):
  196.1 g of deionized water
  6.2 g of Adeka Reasoap SR-1025 (25 wt % aqueous solution)
  45.5 g of methacrylic acid
  18.2 g of a 25 wt % strength solution of ureidoethyl methacrylate in methyl methacrylate
  300.3 g of methyl methacrylate
  45.5 g of n-butyl acrylate
  227.5 g of a 20 wt % strength aqueous solution of diacetoneacrylamide, and
  21.0 g of 2-ethylhexyl thioglycolate
Feed 3:
  27.0 g of a 25 wt % strength ammonia solution
Feed 4 (homogeneous mixture of):
  387.0 g of deionized water
  17.7 g of a 15 wt % aqueous solution of sodium lauryl sulfate
  658.0 g of n-butyl acrylate
  280.0 g of methyl methacrylate, and
  7.0 g of allyl methacrylate
Feed 5:
  9.0 g of a 25 wt % strength ammonia solution
Feed 6 (homogeneous solution of):
  9.3 g of deionized water and
  0.7 g of sodium peroxodisulfate After the end of feeds 4 and 6, the polymerization mixture was left to react further at 80° C. for 30 minutes; then 167.2 g of deionized water were added and stirring was carried out at 80° C. for 90 minutes more.

The aqueous polymer dispersion obtained was then cooled to room temperature. At room temperature, 189.6 g of a 12 wt % strength aqueous solution of adipic dihydrazide were added. Lastly, the dispersion was filtered through a 125 µm filter.

The resulting 3425.8 g of the aqueous polymer dispersion had a solids content of 42.5 wt %, the MFFT was ≤0° C. On dilution with deionized water, the aqueous polymer dispersion has a weight-average particle diameter of 47 nm (measured by means of HDC).

COMPARATIVE EXAMPLE 6—ADEKA REASOAP ONLY IN FEED 4 (CE6)

A polymerization vessel equipped with metering devices and temperature regulation was charged at 20 to 25° C. (room temperature) under a nitrogen atmosphere with
  719.6 g of deionized water and
  30.8 g of a 15 wt % aqueous solution of sodium lauryl sulfate
and this initial charge was heated to 80° C. with stirring. When this temperature had been reached, the entire feed 1 was added and stirring took place for 2 minutes. Thereafter feed 2 was commenced and was metered in over the course of 45 minutes. After the end of feed 2, polymerization was continued for 10 minutes, then feed 3 was added and stirred in for 10 minutes. Subsequently feed 4 was commenced. When 50% of this feed had been metered in, over 45 minutes, the feed was stopped, and feed 5 was added and stirred in for 10 minutes. Then the remainder of feed 4 and, in parallel therewith, feed 6 were metered in over the course of 45 minutes.

Feed 1 (homogeneous solution of):
  55.8 g of deionized water and
  4.2 g of sodium peroxodisulfate
Feed 2 (homogeneous mixture of):
  192.1 g of deionized water
  10.3 g of a 15 wt % aqueous solution of sodium lauryl sulfate
  45.5 g of methacrylic acid
  18.2 g of a 25 wt % strength solution of ureidoethyl methacrylate in methyl methacrylate
  300.3 g of methyl methacrylate
  45.5 g of n-butyl acrylate
  227.5 g of a 20 wt % strength aqueous solution of diacetoneacrylamide, and
  21.0 g of 2-ethylhexyl thioglycolate
Feed 3:
  27.0 g of a 25 wt % strength ammonia solution
Feed 4 (homogeneous mixture of):
  396.1 g of deionized water
  10.6 g of Adeka Reasoap SR-1025 (25 wt % aqueous solution)
  658.0 g of n-butyl acrylate
  280.0 g of methyl methacrylate, and
  7.0 g of allyl methacrylate
Feed 5:
  9.0 g of a 25 wt % strength ammonia solution
Feed 6 (homogeneous solution of):
  9.3 g of deionized water and
  0.7 g of sodium peroxodisulfate After the end of feeds 4 and 6, the polymerization mixture was left to react further at 80° C. for 30 minutes; then 167.2 g of deionized water were added and stirring was carried out at 80° C. for 90 minutes more.

The aqueous polymer dispersion obtained was then cooled to room temperature. At room temperature, 189.6 g of a 12 wt % strength aqueous solution of adipic dihydrazide were added. Lastly, the dispersion was filtered through a 125 µm filter.

The resulting 3425.3 g of the aqueous polymer dispersion had a solids content of 42.4 wt %, the MFFT was ≤0° C. On dilution with deionized water, the aqueous polymer dispersion has a weight-average particle diameter of 46 nm (measured by means of HDC).

Formulation of the Stain

| Deionized water | | 110 |
| --- | --- | --- |
| Tego Foamex 810 | Defoamer from Evonik Industries AG | 4 |
| Butyl diglycol | Film-forming assistant | 27 |
| Tinuvin 1130 | Light stabilizer from BASF SE | 5 |
| Hydropalat WE 3240 | Wetting agent from BASF SE | 2 |
| Tego Airex 902W | Defoamer from Evonik Industries AG | 3 |
| Ammonia | Neutralizing agent (25 wt %) | 2 |
| Acematt TS 100 | Matting agent from Evonik Industries AG | 12.5 |
| Deuteron MK | Matting agent from Deuteron GmbH | 12.5 |
| Rheovis PU1190 | Thickener from BASF SE | 11.5 |
| Deionized water | | 20 |
| Dispersion | 42.5 wt % | 755 |
| Deionized water | | 35.5 |
| Total | | 1000 |

Results of the Experiments

|  |  | IE4 | CE5 | CE6 |
|---|---|---|---|---|
| Stain | Whitening after 1 h (school grade) | 3 | 3-4 | 3-4 |
|  | Capillary water absorption (g/m² × 3 d) | 86 | 99 | 118 |
|  | Pendulum hardness (s) | 38 | 38 | 35 |

What is claimed is:

1. A polymer dispersion obtained by at least one, two-stage emulsion polymerization process comprising:
   1) performing a first radical polymerization of a first composition comprising:
      A) at least one first monomer, and
      B) at least one first anionic copolymerizable emulsifier, to obtain a polymer A;
   2) admixing the polymer A with a base, to obtain a treated polymer A; and
   3) in the presence of the treated polymer A, performing a second radical polymerization of a second composition comprising:
      A) at least one second monomer, and
      B) at least one second anionic copolymerizable emulsifier,
to obtain a polymer B,
wherein:
   a weight-average molecular weight of the polymer A is between 5 and 25 kDa;
   the at least one first monomer contained in the first composition is selected such that a glass transition temperature calculated for the polymer A ranges from 70° C. to 125° C.; and
   the at least one first anionic copolymerizable emulsifier, the at least one second anionic copolymerizable emulsifier, or both, is selected from the group consisting of:
   (1) a compound of formula (I):

where
R1 is H, alkyl, cycloalkyl, aralkyl, aryl, or alkoxyaryl,
R2, R2' is H, or R2 and R2' together represent =O,
R3 is H or alkyl,
R4 is H or OH,
X is $SO_3^-$, $HPO_4^-$, $PO_4^{2-}$, or $COO^-$,
m is 0 or 1, and
n is an integer between 0 and 1000;
(2) a compound of formula (II):

where
X is $SO_3^-$, $PO_4^{2-}$, or $SO_4^-$, and
R is H, alkyl, cycloalkyl, aralkyl, aryl or alkoxyaryl;
(3) a compound of formula (III):

where
R1 is H, alkyl, cycloalkyl, aralkyl, aryl or alkoxyaryl,
X is $SO_4^-$, $SO_3^-$, $HPO_4^-$, $PO_4^{2-}$, or $COO^-$, and
n is an integer between 0 and 1000; and
(4) a compound of the formula (IV):

where
R1 is H, alkyl, cycloalkyl, aralkyl, aryl, or alkoxyaryl,
Y is $SO_3^-$, $PHO_3^-$, or $PO_3^{2-}$, and
n is an integer between 0 and 1000;
or mixtures of the compounds of the formulae (I) to (IV).

2. The polymer dispersion according to claim 1, wherein the polymer A is prepared by the radical emulsion polymerization in an aqueous medium.

3. The polymer dispersion according to claim 1, wherein the polymer dispersion further comprises:
   a crosslinking additive.

4. The polymer dispersion according to claim 1, wherein the polymer A is dispersed in water.

5. The polymer dispersion according to claim 1, wherein the first composition comprises:
   A1) at least one (cyclo)alkyl (meth)acrylate,
   A2) at least one α,β-ethylenically unsaturated carboxylic acid,
   A3) at least one compound selected from the group consisting of 2-(2-oxoimidazolidin-1-yl)ethyl (meth)acrylate, 2-ureidoethyl (meth)acrylate (UMA), acetoacetoxyethyl acrylate, acetoacetoxypropyl methacrylate, acetoacetoxybutyl methacrylate, 2-(acetoacetoxy) ethyl methacrylate, diacetoneacrylamide (DAAM), diacetonemethacrylamide, or mixtures thereof, and
   A4) at least one chain transfer agent, and
   B) the at least one first anionic copolymerizable emulsifier,
wherein the at least one first monomer A) comprises A1)-A3).

6. The polymer dispersion according to claim 1, wherein the second composition comprises:
   A1) at least one (cyclo)alkyl (meth)acrylate, a vinylaromatic, or both, and
   B) the at least one second anionic copolymerizable emulsifier,
wherein the at least one second monomer comprises A1).

7. The polymer dispersion according to claim 1, wherein the at least one first anionic copolymerizable emulsifier, the at least one second anionic copolymerizable emulsifier, or both, is/are a compound of formula (III):

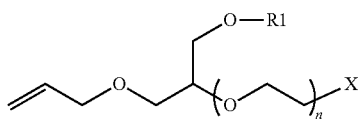

where
R1 is H, alkyl, cycloalkyl, aralkyl, aryl or alkoxyaryl,
X is $SO_4^-$, $SO_3^-$, $HPO_4^-$, $PO_4^{2-}$, or $COO^-$, and
n is an integer between 0 and 1000.

8. The polymer dispersion according to claim 1, wherein a particle size of the polymer A, polymer B, or both, ranges from 1 nm to 100 nm.

9. The polymer dispersion according to claim 1, wherein the first composition comprises:
A1) 40-94 wt % of at least one (cyclo)alkyl (meth)acrylate,
A2) 1-15 wt % of at least one α,β-ethylenically unsaturated carboxylic acid, and
A3) 5-45 wt % of at least one compound selected from the group consisting of 2-(2-oxoimidazolidin-1-yl)ethyl (meth)acrylate, 2-ureidoethyl (meth)acrylate (UMA), aceto acetoxyethyl acrylate, acetoacetoxypropyl methacrylate, acetoacetoxybutyl methacrylate, 2-(acetoacetoxy)ethyl methacrylate, diacetoneacrylamide (DAAM), diacetonemethacrylamide, or mixtures thereof,
being based in each case on 100 wt % of monomers contained in the first composition, and
wherein the at least one first monomer A) comprises A1)-A3.

10. The polymer dispersion according to claim 1, wherein the first composition comprises:
A1) 40-93.9 wt % of at least one (cyclo)alkyl (meth)acrylate,
A2) 1-15 wt % of at least one α,β-ethylenically unsaturated carboxylic acid,
A3) 5-20 wt % of at least one compound selected from the group consisting of 2-(2-oxoimidazolidin-1-yl)ethyl (meth)acrylate, 2-ureidoethyl (meth)acrylate (UMA), aceto acetoxyethyl acrylate, acetoacetoxypropyl methacrylate, acetoacetoxybutyl methacrylate, 2-(acetoacetoxy)ethyl methacrylate, diacetoneacrylamide (DAAM), diacetonemethacrylamide, or mixtures thereof,
A4) 0-5 wt % of at least one chain transfer agent, and
B) 0.05-5 wt % of at least one anionic copolymerizable emulsifier, based in each case on 100 wt % of monomers contained in the first composition, and
wherein the at least one first monomer A) comprises A1)-A3.

11. The polymer dispersion according to claim 1, wherein the polymer dispersion does not contain a nonpolymerizable emulsifier.

12. A process for preparing a polymer dispersion, the process comprising performing at least one, two-stage emulsion polymerization process comprising:
1) performing a first radical polymerization of a first composition comprising:
A) at least one first monomer, and
B) at least one anionic first copolymerizable emulsifier, to obtain a polymer A;
2) admixing the polymer A with a base, to obtain a treated polymer
3) in the presence of the treated polymer A, performing a second radical polymerization of a second composition comprising:
A) at least one hydrophilic second monomer, hydrophobic second monomer, or both, and
B) at least one second anionic copolymerizable emulsifier, wherein
the weight-average molecular weight of the polymer A is between 5 and 25 kDa;
the at least one first monomer contained in the first composition is selected such that the glass transition temperature calculated for the polymer A ranges from 70° C. to 125° C.; and
the at least one first anionic copolymerizable emulsifier, the at least one second anionic copolymerizable emulsifier, or both, is selected from the group consisting of:
(2) a compound of formula (I):

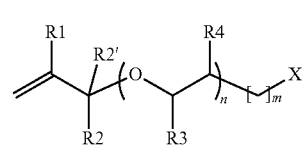

where
R1 is H, alkyl, cycloalkyl, aralkyl, aryl, or alkoxyaryl,
R2, R2' is H, or R2 and R2' together represent =O,
R3 is H or alkyl,
R4 is H or OH,
X is $SO_3^-$, $HPO_4^-$, $PO_4^{2-}$, or $COO^-$,
m is 0 or 1, and
n is an integer between 0 and 1000;
(2) a compound of formula (II):

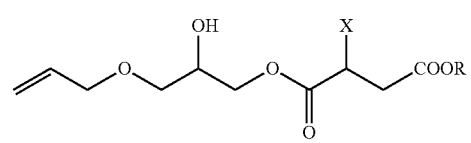

where
X is $SO_3^-$, $PO_4^{2-}$, or $SO_4^-$, and
R is H, alkyl, cycloalkyl, aralkyl, aryl or alkoxyaryl;
(3) a compound of formula (III):

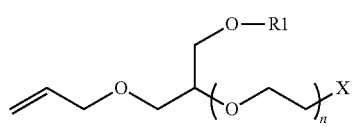

where
R1 is H, alkyl, cycloalkyl, aralkyl, aryl or alkoxyaryl,
X is $SO_4^-$, $SO_3^-$, $HPO_4^-$, $PO_4^{2-}$, or $COO^-$, and
n is an integer between 0 and 1000; and (4) a compound of the formula (IV):

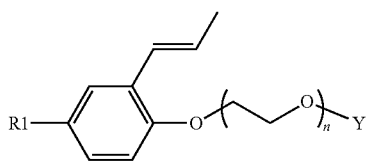

where
R1 is H, alkyl, cycloalkyl, aralkyl, aryl, or alkoxyaryl,
Y is $SO_3^-$, $PHO_3^-$, or $PO_3^{2-}$, and
n is an integer between 0 and 1000;
or mixtures of the compounds of the formulae (I) to (IV).

13. A process for preparing a polymer dispersion, the process comprising performing at least one, two-stage emulsion polymerization process comprising:
1) performing a first radical polymerization of a first composition comprising:
   A1) at least one (cyclo)alkyl (meth)acrylate,
   A2) at least one α,β-ethylenically unsaturated carboxylic acid,
   A3) at least one compound selected from the group consisting of 2-(2-oxoimidazolidin-1-yl)ethyl (meth) acrylate, 2-ureidoethyl (meth)acrylate (UMA), aceto acetoxyethyl acrylate, acetoacetoxypropyl methacrylate, acetoacetoxybutyl methacrylate, 2-(acetoacetoxy) ethyl methacrylate, diacetoneacrylamide (DAAM), diacetonemethacrylamide, or mixtures thereof, and
   A4) at least one chain transfer agent, and
   B) at least one first anionic copolymerizable emulsifier, to obtain a polymer A;
2) admixing the polymer A with a base, to obtain a treated polymer A; and
3) in the presence of the treated polymer A, performing a second radical polymerization of a second composition to obtain a polymer B, the second composition comprising
   A1) at least one (cyclo) (meth)acrylate, and
   B) at least one second anionic copolymerizable emulsifier,
wherein:
a weight-average molecular weight of the polymer A is between 5 and 25 kDa; and the at least one first monomer contained in the first composition is selected such that a glass transition temperature calculated for the polymer A ranges from 70° C. to 125° C.

14. The process according to claim 13, wherein the at least one first anionic copolymerizable emulsifier, the at least one second anionic copolymerizable emulsifer, or both, comprises
a compound of formula (III):

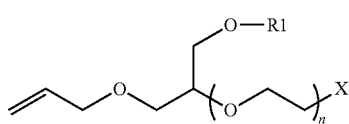

where
R1 is H, alkyl, cycloalkyl, aralkyl, aryl or alkoxyaryl,
X is $SO_4^-$, $SO_3^-$, $HPO_4^-$, $PO_4^{2-}$, or $COO^-$, and
n is an integer between 0 and 1000.

15. A coating material in the form of an aqueous composition, the coating material comprising:
   i) at least one polymer dispersion according to claim 1,
   ii) optionally at least one (in)organic filler, (in)organic pigment, or both,
   iii) optionally an additive, and
   iv) water.

16. A polymer dispersion obtained by at least one, two-stage emulsion polymerization process comprising:
1) performing a first radical polymerization of a first composition comprising:
   A) at least one first monomer, and
   B) at least one first anionic copolymerizable emulsifier, to obtain a polymer A;
2) admixing the polymer A with a base, to obtain a treated polymer A; and
3) in the presence of the treated polymer A, performing a second radical polymerization of a second composition comprising:
   A) at least one second monomer, and
   B) at least one second anionic copolymerizable emulsifier, to obtain a polymer B,
wherein:
a weight-average molecular weight of the polymer A is between 5 and 25 kDa;
the at least one first monomer contained in the first composition is selected such that a glass transition temperature calculated for the polymer A ranges from 70° C. to 125° C.;
the first composition comprises:
   A1) at least one (cyclo)alkyl (meth)acrylate,
   A2) at least one α,β-ethylenically unsaturated carboxylic acid,
   A3) at least one compound selected from the group consisting of 2-(2-oxoimidazolidin-1-yl)ethyl (meth) acrylate, 2-ureidoethyl (meth)acrylate (UMA), acetoacetoxyethyl acrylate, acetoacetoxypropyl methacrylate, acetoacetoxybutyl methacrylate, 2-(acetoacetoxy) ethyl methacrylate, diacetoneacrylamide (DAAM), diacetonemethacrylamide, or mixtures thereof, and
   A4) at least one chain transfer agent, and
   B) the at least one first anionic copolymerizable emulsifier,
in which the at least one first monomer A) comprises A1)-A3); and
the second composition comprises:
   A1) at least one (cyclo)alkyl (meth)acrylate, a vinylaromatic, or both, and
   B) the at least one second anionic copolymerizable emulsifier,
in which the at least one second monomer comprises A1).

* * * * *